(12) United States Patent
Moser et al.

(10) Patent No.: US 10,781,735 B2
(45) Date of Patent: Sep. 22, 2020

(54) EXHAUST EMISSION REDUCTION SYSTEM HAVING AN HC-TRAP AND NOX-TRAP COMBINATION DESIGNED FOR OPERATING UNDER STRATEGIC LEAN CONDITIONS

(71) Applicant: UMICORE AG & CO. KG, Hanau-Wolfgang (DE)

(72) Inventors: David Moser, Ortonville, MI (US); John Nunan, Tulsa, OK (US); Chad Alltizer, Broken Arrow, OK (US)

(73) Assignee: Umicore AG & CO KG, Hanau-Wolfgang (DE)

( * ) Notice: Subject to any disclaimer, the term of this patent is extended or adjusted under 35 U.S.C. 154(b) by 179 days.

(21) Appl. No.: 15/983,300

(22) Filed: May 18, 2018

(65) Prior Publication Data

US 2019/0353068 A1    Nov. 21, 2019

(51) Int. Cl.
*F01N 3/20* (2006.01)
*F01N 3/08* (2006.01)
(Continued)

(52) U.S. Cl.
CPC ......... *F01N 3/0871* (2013.01); *B01D 53/945* (2013.01); *B01D 53/9422* (2013.01);
(Continued)

(58) Field of Classification Search
CPC ............ B01D 53/9468; B01D 53/9472; B01D 2255/9022; B01D 2255/9032;
(Continued)

(56) References Cited

U.S. PATENT DOCUMENTS

| 6,602,820 B1 | 8/2003 | Goebel et al. |
| 2002/0187893 A1* | 12/2002 | Yamada ............. B01D 53/9422 502/304 |

(Continued)

FOREIGN PATENT DOCUMENTS

| DE | 10 2009 039 249.1 | 8/2009 |
| DE | 10 2008 048 854 A1 | 4/2010 |

(Continued)

OTHER PUBLICATIONS

International Search Report and Written Opinion of the International Searching Authority for International Patent Application No. PCT/EP2019/062632 dated Jul. 9, 2019 (12 pages).

(Continued)

*Primary Examiner* — Jonathan R Matthias
(74) *Attorney, Agent, or Firm* — Smith, Gambrell & Russell, LLP

(57) ABSTRACT

Methods and systems are featured for reducing harmful exhaust gas components of combustion devices such as gasoline-powered combustion engines (e.g., predominately stoichiometric running engines). The methods and systems include an underbody combination of a hydrocarbon trap (HCT), suited for cold start hydrocarbon adsorption, as well as an associated NOx trap. The system is inclusive of a control unit for extending a lean exhaust condition reaching the desorbing HCT as to avoid a deficiency in oxygen during the time period of HCT desorption. The system is also inclusive of one or more TWCs as in one associated with the underbody HCT-NOx-trap combination and/or one positioned in a close coupled position. Platinum group metals as in Pd, Rh and Pt are also featured on one, two or all three of the HCT, NOx-trap, and TWC when present.

28 Claims, 10 Drawing Sheets

(51) Int. Cl.
  *B01D 53/94* (2006.01)
  *B01J 29/068* (2006.01)
  *B01J 35/00* (2006.01)
  *F01N 3/10* (2006.01)

(52) U.S. Cl.
  CPC ..... *B01D 53/9468* (2013.01); *B01D 53/9472* (2013.01); *B01D 53/9477* (2013.01); *B01J 29/068* (2013.01); *B01J 35/0006* (2013.01); *F01N 3/0835* (2013.01); *F01N 3/0842* (2013.01); *F01N 3/101* (2013.01); *F01N 3/2066* (2013.01); *B01D 2255/1023* (2013.01); *B01D 2255/904* (2013.01); *B01D 2255/9022* (2013.01); *B01D 2255/9032* (2013.01); *B01D 2255/9035* (2013.01); *B01D 2255/912* (2013.01); *B01D 2255/9155* (2013.01); *F01N 2370/02* (2013.01)

(58) Field of Classification Search
  CPC ...... F01N 3/0835; F01N 3/0842; F01N 3/101; F01N 2250/12; F01N 2570/12; F01N 2570/14; F01N 2570/16
  See application file for complete search history.

(56) References Cited

U.S. PATENT DOCUMENTS

| | | |
|---|---|---|
| 2010/0055012 A1 | 3/2010 | Grisstede et al. |
| 2010/0126154 A1 | 5/2010 | Klingmann et al. |
| 2010/0135879 A1 | 6/2010 | Roesch et al. |
| 2011/0277450 A1 | 11/2011 | Hoyer et al. |
| 2013/0017121 A1 | 1/2013 | Bisaiji et al. |
| 2014/0030160 A1 | 1/2014 | Inoue et al. |
| 2014/0112849 A1 | 4/2014 | Wen et al. |
| 2016/0082427 A1 | 3/2016 | Adam et al. |
| 2016/0228818 A1 | 8/2016 | Chang et al. |
| 2016/0245207 A1 | 8/2016 | Ball et al. |

FOREIGN PATENT DOCUMENTS

| | | |
|---|---|---|
| EP | 1 101 528 A2 | 5/2001 |
| EP | 1 317 953 A1 | 6/2003 |
| EP | 1 398 069 A2 | 3/2004 |
| EP | 1 016 448 B1 | 5/2006 |
| EP | 1 321 186 B1 | 7/2006 |
| EP | 1 837 497 A1 | 9/2007 |
| EP | 1 911 506 A1 | 4/2008 |
| EP | 1 974 809 A1 | 10/2008 |
| EP | 2 173 983 B1 | 4/2010 |
| EP | 1 974 810 B1 | 8/2010 |
| EP | 2 924 257 A1 | 9/2015 |
| JP | 2010 031737 | 2/2010 |
| WO | 0218753 | 3/2002 |
| WO | 2005/092481 A1 | 10/2005 |
| WO | 2011/023332 A1 | 3/2011 |
| WO | 2012/069404 A1 | 5/2012 |
| WO | 2012/069405 A1 | 5/2012 |
| WO | 2012/140784 A1 | 10/2012 |
| WO | 2013/008342 A1 | 1/2013 |
| WO | 2016/065034 A1 | 4/2016 |
| WO | 2017/034920 A1 | 3/2017 |

OTHER PUBLICATIONS

N. Miyoshi, et al. SAE Technical Paper Series 950809, Feb. 27-Mar. 2, 1995, pp. 121-130. Development of New Concept Three-Way Catalyst for Automotive Lean-Burn Engines.

Heck, et al. Catalytic Air Pollution Control Commercial Technology, $3^{rd}$ Ed, 2009, Ch. 6.11, Toward a Zero-Emission Stoichiometric Spark-Ignition Vehicle, pp. 148-157.

* cited by examiner

EXHAUST EMISSION REDUCTION SYSTEM HAVING AN HC-TRAP AND NOX-TRAP COMBINATION DESIGNED FOR OPERATING UNDER STRATEGIC LEAN CONDITIONS

FIELD OF INVENTION ASPECTS

The present invention is inclusive of systems for reducing harmful exhaust gas components of combustion devices such as gasoline-powered combustion engines (e.g., predominately stoichiometric running engines), to corresponding methods for exhaust gas purification, and to methods of assembling such systems. Invention systems are directed at improving conversion of desorbing cold start accumulated HCs, and lowering overall HC emissions, and include exhaust emission reduction systems characterized by a combination of (i) a lean running operation control unit and (ii) an HCT-NOx-trap combination, as well as each of (i) and (ii) individually.

BACKGROUND OF THE INVENTION

The exhaust gas of combustion engines in, for example, motor vehicles, typically contains harmful carbon monoxide (CO), hydrocarbons (HC), nitrogen oxides (NOx) and possibly sulfur oxides (SOx), as well as particulates that mostly consist of soot residues and possibly adherent organic agglomerates. The pollutants CO, HC, and particulates are the products of the incomplete combustion of the fuel inside the combustion chamber of the engine. Nitrogen oxides form in the cylinder from nitrogen and oxygen in the intake air when the combustion temperature is sufficiently high for such a reaction. Sulfur oxides result from the combustion of organic sulfur compounds, small amounts of which can be present in non-synthetic fuels.

For the removal of these emissions from the exhaust gases of motor vehicles, a variety of technologies for the purification of exhaust gases have been developed, the fundamental principle of which is usually based upon guiding the exhaust gas that needs purification over a catalyst device often consisting of a flow-through or wall-flow honeycomb-like substrate and a catalytically active coating applied to it. This catalyst device facilitates the chemical reaction of different exhaust gas components, while forming non-hazardous products like carbon dioxide and water. The mode of operation and the composition of the catalysts that are used differ significantly depending upon the composition of the exhaust gas to be purified and the exhaust gas temperature level that is to be expected at the catalyst. A variety of compositions used in exhaust emission reduction contain components, in which, under certain operating conditions, one or more exhaust gas components can be temporarily bound and, when an appropriate change in operating conditions occurs, be intentionally released again. Components with such a capacity are generally referred to below as storage or trapping material components.

Exhaust gases from internal combustion engines operated with a predominantly stoichiometric air/fuel (A/F) mixture, like, e.g., port-fuel injection (PFI) engines, stratified charge engines (SCE), and gasoline direct injection engines (GDI), are cleaned according to conventional methods such as with the aid of three-way catalytic (TWC) converters. A TWC is capable of converting the three essentially gaseous pollutants of the engine; specifically, hydrocarbons, carbon monoxide, and nitrogen oxides, simultaneously to harmless components. In other words, TWC's used with a gasoline engine perform three main functions: (1) oxidation of CO; (2) oxidation of unburnt hydrocarbons; and (3) reduction of NOx to $N_2$.

For many gasoline engines, after-treatment of the exhaust gases involving TWC is also combined with engine management of air fuel ratios in an effort to facilitate reductions at the TWC site of carbon monoxide, hydrocarbon and nitrogen oxide pollutants. For example, many gasoline engines have electronic fuel injection systems that provide a constantly varying air-fuel mixture that quickly and continually cycle between lean and rich exhaust. The precise proportion of air to fuel which results in stoichiometric conditions can vary with the relative proportions of carbon and hydrogen in the fuel. An air-to-fuel (A/F) ratio is the stoichiometric ratio corresponding to the complete combustion of a hydrocarbon fuel, such as gasoline, to carbon dioxide ($CO_2$) and water. The symbol $\lambda$ is thus used to represent the result of dividing a particular A/F ratio by the stoichiometric A/F ratio for a given fuel, so that: $\lambda=1$ is a stoichiometric mixture, $\lambda>1$ is a fuel-lean mixture, and $\lambda<1$ is a fuel-rich mixture.

A typical exhaust after-treatment system for a stoichiometric-burn gasoline engine consists of two three-way conversion (TWC) catalysts, a first/upstream TWC catalyst mounted in a position near the exhaust manifold and the engine compartment (the close-coupled position, CC), and a second/downstream TWC catalyst placed in a position either closely next to the first TWC catalyst (the second close-coupled position, CC2) or underneath the vehicle body (the underfloor UF or underbody UB position). The first TWC catalyst is quickly heated up during cold start and provides the majority of conversions for pollutants including NOx, HC and CO. The second TWC catalyst supplements the catalytic activities, particularly after light-off. Furthermore, to be highly effective the upstream $TWC_{cc}$ generally requires the temperature of the exhaust gas to be sufficiently high enough as in close to 300° C. or above for some systems, which is often a temperature not available under initial, cold start engine operation.

Relative to the impending regulations as to emission levels, an area of difficulty includes the cold start period, wherein the exhaust temperature has not yet reached a temperature suited for sufficiently effective catalyst operation. One technique that has been developed in an effort to confront the difficulty of emission control, under cold start conditions, includes the inclusion of a hydrocarbon trap designed to trap hydrocarbons traveling through the emission system during cold start conditions and then release, through desorption, the hydrocarbons into the exhaust flow at a time when the temperature is higher. This desorption period of a hydrocarbon trap (HCT) represents an additional region of difficulty in exhaust emission control.

US 2016/0228818 to Chang et al., is one example of the above described usage of an HCT for cold start hydrocarbon control. Chang features an HCT formed as an extruded body comprising zeolite hydrocarbon trapping components. The molecular sieve zeolite component in the extrudate is that which adsorbs and stores the hydrocarbons during the start-up period and rapidly releases the stored hydrocarbons when the exhaust temperature is high enough to desorb hydrocarbons. In Chang, the desorbed hydrocarbons are subsequently converted by a TWC component such as one disposed on the extruded HC-trap body.

However, even with the benefit of a TWC layer over the extruded HC-trap, many engine systems fail to satisfy imposed emission values, particularly those standards being currently regulated for future compliance. A particular area of difficulty, relative to the emission control standards, is satisfying the regulated level as to the combination of non-methane hydrocarbons (or nMHC's) plus (NOx) emissions, such as those found either during the cold start or in the light-off of HC's previously trapped during the engine cold start phase.

For example, the US State of California has imposed stringent LEVIII emission regulations, inclusive of a combined (non-methane organic gas+nitrogen oxides) or (nMOG+NOx) standard approaching 30 mg/mi by the year 2025. Some regulations also refer to nMHC or non-methane hydrocarbons. One difference between NMOG and NMHC is that NMOG refers to fuels containing ethanol, such as E85 or E10. Accordingly, the NMOG standard is more difficult to meet as emissions associated with oxygenates, such as ethanol and acetaldehyde, are difficult to convert over a conventional TWC catalyst. These NMOG related components are often referred to as oxygenates in the exhaust. The US Federal Environmental Protection Agency has also imposed similar stringent restrictions on the noted nMOG+NOx (or non-methane hydrocarbons+nitrous oxides or nMHC+NOx) and provides formulas for NMOG and NMHC conversion.

The noted regions of cold start and/or catalyst light-off period of the Federal Test Protocol (FTP) cycle continue to represent the main contributors to overall emissions, and challenges in meeting these more stringent standards. Furthermore, efforts to address one of the noted regions of difficult HC emission control often can lead to degradation in the other one. For example, improvements in the ability of an HC-trap to adsorb HCs and oxygenates during cold start can render it even more difficult to control the period during desorption where the high quantity HC load is released rapidly.

Reference is further made to FIG. 14, which shows a schematic view of another conventional exhaust gas aftertreatment system 20 for the removal of pollutants from an engine's exhaust flow. An example of the system 20 can be found in Heck et al. "Catalytic Air Pollution Control Commercial Technology" 3d Ed, 2009, Chapt. 6.11, *Toward A Zero-Emission Stoichiometric Spark-Ignition Vehicle*, pgs. 148 to 157, which is incorporated herein by reference. As seen in FIG. 14, emissions control system 20 includes a gasoline engine 22 that outputs exhaust gas to the catalyst system 24 comprising, in exhaust flow sequence, a close coupled three-way catalyst 26 and an under-floor hydrocarbon trap ($HCT_{uf}$) 28.

The approach shown in FIG. 14 is used to confront the issue of the lack of catalytic performance in the $TWC_{cc}$ during cold start via the adsorption of hydrocarbons in the downstream $HCT_{uf}$. At light-off temperature the system reaches a temperature wherein previously stored hydrocarbons are released from the $HCT_{uf}$ leading to increased pollutant output in the system.

With further reference to FIG. 14 there can be seen that the $HCT_{uf}$ 28 features a catalytic TWC layer L2 used in an effort to oxidize the hydrocarbons upon desorption from the underlying zeolite HCT Layer L1. In other words, FIG. 14 shows a layering schematic for a catalyzed $HCT_{uf}$, featuring a two layer combination of under-layer L1 (zeolite-HCT) and over-layer L2 (TWC) supplied on a supporting substrate 29.

The two layer combination for $HCT_{uf}$ 28 functions such that the HC's that are trapped in the zeolitic HCT during the engine cold start phase, are released in a desorption phase that occurs when the light-off temperature is reached at the $HCT_{uf}$ 28. Thus, there is a desorption period that initiates at light-off (and continues until the HC's are released) during which desorption period HC's desorb from the HC-trap as a function of its temperature. The TWC over-layer L2 in the $HCT_{uf}$ 28 is designed to help in the catalytic treatment of the desorbed HCs. However, in order for the desorbing HC's to be efficiently converted into $H_2O$ and $CO_2$, oxygen availability is paramount, which, as explained in greater detail below, is not sufficiently present in the referenced prior art approaches.

Additional prior art references directed at reducing both HC breakthrough during cold start and NOx breakthrough at a hot stage, include WO2016/065034 and WO2017/034920. These two references each take an approach involving heavy emphasis on SCR usage, and include, for example, with respect to WO '920, close coupled TWCs followed by a combined SCR-HCT catalyst system, wherein the SCR-HCT catalyst combination traps breakthrough hydrocarbons during cold start and releases the stored HC at a relatively higher exhaust temperature. Simultaneously, the SCR-HCT catalyst stores ammonia generated by the upstream TWC catalyst and converts breakthrough NOx by means of $NH_3$—SCR reactions. WO '920 further includes a third catalyst with platinum group metal downstream from its SCR-HCT combination. WO '034, with its emphasis as well on SCR usage, features a combination SCR-Second Catalyst, with the second catalyst directed at HC and CO abatement.

The above prior art references, however, fail to appreciate some of the limitations associated with their exhaust system set ups (typically featuring upstream TWCcc), particularly the inability for such systems to properly convert released HCs at a time that is sensitive relative to efforts to meet the regulatory limitations on exhaust emission output. That is, the HC emission reduction for an HC-trap located in an underbody UB (or underfloor UF) exhaust position is highly dependent upon the availability of oxygen during the HC desorption phase. In other words, after HC's are trapped during the engine cold start phase, a release phase occurs during which time HC's rapidly desorb from the HC-trap. In order for these desorbing HC's to be efficiently converted into $H_2O$ and $CO_2$, oxygen must be available for oxidation. However, for typical modern calibrated vehicles, lean operation (if present) after initial startup is short and does not adequately extend into the HC desorption phase of the HC-trap. HC desorption typically occurs when the trap in the UB location reaches, for example, an inlet gas temperature of 200° C. (for some systems) or 300° C. (for other systems) or higher (in still other systems). By this time, (e.g., 50-150 seconds into the FTP test), the calibration on the vehicle is either at or close to stoichiometry and/or an extensive amount, if not essentially all, of available oxygen has already been consumed by upstream combustion of HCs and CO, such as over a close-coupled catalyst. This results in too little oxygen being available during the rapid release of HCs during HC desorption phase from the HCT. The prior art catalyst arrangements and compositions do not adequately take this environmental condition into consideration in their designs.

SUMMARY INFORMATION

The present invention takes a different approach than the prior art approaches described above, and includes exhaust emission reduction systems that combine the features of an HC-trap with a NOx trap (HC-NOx trap combination or "TRAP" for reference convenience). The TRAP is well suited for usage together with a strategic lean running control operation system during a defined period (e.g., predefined period, a sensor/feedback based determined time period, or a combination as in a predefined period with fine-tuned real time sensor(s) adjustments) directed at providing sufficient oxygen supplies to enable efficient HC conversion during the HCT desorption stage. Since the NOx-trap used for removing NOx is associated, under an embodiment of the invention, with an extended lean period calibrated run in the engine, reference is made to a lean NOx trap (LNT) as a common reference to "NOx-trap" below.

Embodiments falling under the scope of the present invention include a control system comprising a control unit that calibrates the air-fuel ratio of the running vehicle engine to lean for an extended period during the initial phase of operation and into the HC desorption range of a HC-trap (e.g., an extension during the initial phase of an FTP test), as in a calibrated lean period extending till the inlet temperature of the HCT in the TRAP reaches 400-450° C. Preferably the lean run period is sufficiently long enough for achieving a conversion of all the desorbing HCs exiting the trap, although other constraints can lead to a time period that is discontinued prior to all of the previously stored HCs having been released and converted, as in a temporary interruption in lean running detected by a sensed higher engine load condition. It is also noted that HCs can come off the trap at different rates and the present invention is preferably designed to accommodate the higher rates that occur during the desorption period release stage, which entails running at a sufficiently lean lambda value (counter to the normal, calibrated desire for the engine to run at a predominately stoichiometric setting) to have enough oxygen during the higher release peaks. In accommodating such varied rates of desorption phase release amounts, an important consideration can be the temperature at the HCT outlet. For instances it has been observed that there can be up to a 100° C. difference between the inlet and outlet bed temperature ("T") of an HCT during the relevant FTP cycle periods. Under aspects of the present invention it is preferable to have the HCT bed temperature at about 350° C. and higher. However, even when higher temperatures are present there is still a requirement for sufficient oxygen for achieving conversion of the desorbing HCs which has been a drawback of prior art systems.

During a controlled lean operation period provided under systems and methods of the present invention, sufficient oxygen is made available for the combustion of released HCs from the HCT component of the TRAP, while at the same time the NOx trap component (or lean nitrogen trap LNT) of the TRAP is configured to adequately capture unconverted NOx that is later reduced to $N_2$ when the calibration goes stoichiometric of slightly rich. Under embodiments falling under the scope of the present invention, the HC-trap is a catalyzed trap as in one where a TWC washcoat is applied to the HCT surface and/or the HCT trapping material is supplemented with catalyst metal from the platinum group metal (PGM) and/or a base metal. Additional embodiments falling under the scope of the present invention include having the TWC washcoat containing PGM material, as in Rh alone or a combination of Rh and Pd as the PGM, or optionally Pd and/or Pt, etc. Aspects of the invention include having all of the Pd present in the TRAP located on the HCT with all of the Rh located in the TRAP located on a TWC overcoating the HCT, when present.

That is, the HCT itself can be provided with material in addition to the trapping material (e.g., trapping zeolites), as in the HCT containing Pd so as to provide an HC-trap with enhanced trapping and conversion of NOx and HCs characteristics. For example, under an aspect of the present invention, there is provided Pd as the only PGM material in the HCT on the basis that such a combination is considered to enhance alkene (ethene/ethylene) and propene adsorption as well as aromatics. For example, an aspect of the present invention is considered to provide an efficient usage of PGMs by putting most of the Pd (as in at least 70% by weight of the total TRAP Pd usage) in the HCT layer if not all (100% of total Pd TRAP usage in the HCT layer).

Examples of suitable loading amounts of Pd for the HCT include 5-100 g/ft$^3$, and more preferably 15-50 g/ft$^3$. Also, the HCT with such Pd loading provides for lowered PGM loadings (relative to standard loadings) in any close coupled TWCs, as well as lowered (if any) Pd loadings in a TWC layer (if present) overcoating the underbody HCT.

Embodiments also feature one or more P-block metals (e.g., In and/or Sn) and/or transition metals in the HCT either with or without the noted PGM such as Fe, Co, Ni, Cu, Ag and mixtures thereof, with Fe being well-suited for the purposes of the invention (e.g., cold start trapping and later lean environment during the desorption period).

With even a more preferred embodiment, under many environments of the present invention, involving the utilization of Rh in the TRAP, and providing at least 70% by weight (and more preferably all or 100% of the TRAP Rh) in the TWC layer alone (as when a TWC layer is involved in the TRAP).

There is also considered to be a negative interaction between the HCT and TWC material/layers as material in the HCT (e.g., silica) can poison the TWC function in the TWC layer. Also, typically the HCT washcoat ("WC") layer is soft and there is likely to be some intermixing of the two layers when coating. As such, an intermixing can be bad for TWC performance, it is thus preferable if the TWC, when present in the TRAP, have Rh as Rh is considered to be the most resistant PGM for negative interactions relative to HCT poisoning material (such as silica (when present)) in the HCT layer for TWC activity. Thus, under preferred embodiments, when a TWC is a component of the underbody TRAP, it includes PGMs of Rh only or Rh and Pd.

Various other configurations and arrangements also fall under the scope of the present invention inclusive of an exhaust emission system featuring, under a first embodiment of the invention, an exhaust emission reduction system suited for use with a predominately stoichiometric engine (e.g., an engine calibrated to run at or close to stoichiometric absent the counter influence of the present invention) comprising:

an exhaust treatment apparatus having an underbody positioned NOx-trap and HC-trap combination (preferably an internally catalyzed HCT as in one having a platinum group metal or PGM loading (such as Pd or Pd and Rh) with or without the added presence of an underbody TWC with its own PGM material, as in Rh);

a control unit configured for extending a lean exhaust condition into a period of desorption of hydrocarbons trapped by the HC-trap as to promote hydrocarbon emission reduction during the desorption period.

A first aspect of the invention, well suited for use in the first embodiment above, is one wherein the NOx-trap and HC-trap combination includes a substrate support onto which the HC-trap is layered and over which HC-trap layer the NOx-trap is layered.

A second aspect of the invention, well suited for use in the first embodiment and/or first aspect above, is one wherein the exhaust treatment apparatus further comprises one or more TWC components.

A third aspect of the invention, well suited for use in the first embodiment and any one of the first and second aspects described above, is one wherein the exhaust treatment apparatus comprises both an upstream close coupled TWC component and a downstream, underbody TWC component in a common support canister with NOx-trap and HC-trap components of the NOx-trap and HC-trap combination.

A fourth aspect of the invention, well suited for use in the first embodiment and any of the first to third aspects above, is one wherein the NOx-trap and HC-trap combination includes a substrate support onto which the HC-trap is layered and over which HC-trap layer the NOx-trap is layered, and wherein one or more TWC components are provided inclusive of a TWC component positioned downstream of the NOx-trap and HC-trap combination.

A fifth aspect of the invention, well suited for use in the first embodiment above and any one of the first to fourth aspects above, is one wherein there is provided one or more TWC components inclusive of a close coupled TWC.

A sixth aspect of the invention, well suited for use in the first embodiment above and any one of the first to fifth aspects above, is one wherein there is provided one or more of TWCs comprising a PGM loading of Rh only or a combination of Pd and Rh, and the HCT comprises a transition metal such as one selected from the group consisting of Ni, Fe, Mn, Co, Cu, a P-block metal (e.g., Sn or In) or a combination of any of the same as well as a PGM.

A seventh aspect of the invention, well suited for use in the first embodiment described above and any one of the first to sixth aspects, is one wherein the NOx-trap and HC-trap combination includes an upstream underbody NOx-trap on a first support substrate and a second support substrate which supports an HC-trap layer and a TWC layer over at least a portion of the HC-trap layer.

An eighth aspect of the invention, well suited for use in the first embodiment above and any one of the first to seventh aspects above is one wherein the TWC (as in a TWC layer covering over at least a portion of the HC-trap) comprises a PGM loading of Rh only or a combination of Pd and Rh, and the HCT comprises a transition metal, a P-block metal (e.g., Sn or In) or a combination of any of the same (e.g., Fe alone).

A ninth aspect of the invention, well suited for use in the first embodiment above and any one of the first to seventh aspects above is one wherein the one or more TWC components further includes a close coupled TWC.

A tenth aspect of the invention, well suited for use in the first embodiment and any one of the first to ninth aspects, is one wherein the exhaust treatment apparatus includes a first support substrate with an HC-trap layer with PGM material and/or a base metal, over which HC-trap layer is supplied one or both of a NOx-trap layer and a TWC layer.

An eleventh sixth aspect of the invention, well suited for use in the first embodiment above and any one of the second to tenth aspects above, is one wherein only a TWC layer is supplied over the HCT-trap layer and a second support substrate is positioned downstream of a (or the) first support substrate, and with the second support substrate supporting the NOx-trap layer of the NOx-trap and HC-trap combination.

A twelfth aspect of the invention, well suited for use in the first embodiment above and any one of the first to tenth aspects above, is one wherein both the TWC layer and the NOx-trap layer is provided over the HC-trap layer so as to be supported on a first support substrate.

A thirteenth aspect of the invention, well suited for use in the first embodiment and any one of the first to eleventh aspects above, is one wherein at least a portion of a (or the) TWC layer is positioned upstream of the NOx-trap layer.

A fourteenth aspect of the invention, well suited for use in the first embodiment above and any one of the first to twelfth aspects above, is one wherein at least a portion of a (or the) TWC layer is positioned downstream of the NOx-trap layer.

A fifteenth aspect of the invention, well suited for use in the first embodiment above and any one of the first to the fourteenth aspects above, is one wherein the first substrate is a porous surfaced monolithic body.

A sixteenth aspect of the invention, well suited for use in the first embodiment above, is one wherein the exhaust treatment apparatus includes a first support substrate which supports a first HC-trap zone and a second zone occupied by one or both of (a) and (b), with (a) being the NOx trap and (b) a TWC layer, and over which first and second zones is provided an over covering of one of (a) or (b) with the over covering being the (a) or (b) not representing the second zone.

A seventeenth aspect of the invention, well suited for use in the first embodiment above and the sixteenth aspect above, is one wherein the HC-trap zone comprises a (i) PGM and/or (ii) a transition metal, a P-block metal (e.g., Sn or In) or a combination of any of the same (e.g., Fe alone).

An eighteenth aspect of the invention, well suited for use in the first embodiment above and the sixteenth aspect above, is one wherein (a) is provided as the second zone, and which second zone is upstream of the HC-trap zone, and (b) extends over each of (a) and the HC-trap zone.

A nineteenth aspect of the invention, well suited for use in the first embodiment above and the sixteenth aspect above, is one wherein (a) is provided as the second zone, and which second zone is downstream of the HC-trap zone, and (b) extends over each of (a) and the HC-trap zone.

A twentieth aspect of the invention, well suited for use in the first embodiment above and the sixteenth aspect above, is one wherein (b) is provided as the second zone, and which second zone is downstream of the HC-trap zone, and (a) extends over each of (b) and the HC-trap zone.

A twenty-first aspect of the invention, well suited for use in the first embodiment above and any one of the first to twentieth aspects, is one wherein the control unit receives input sensing informative of HC desorption characteristics and extends a period of lean exhaust supply to the HC-trap layer.

A twenty-second aspect of the invention, well suited for use in the first embodiment and any one of the first to twenty-first aspects, is one wherein the control unit sets a time period or system temperature parameter which ensures a lean exhaust supply to the HC-trap layer at a time when the HC-trap layer is desorbing hydrocarbons.

A twenty-third aspect of the invention, well suited for use in the first embodiment and any one of the first to twenty-second aspects, is one wherein the control unit receives feedback monitoring information as to desorption characteristics or desorption period timing relative to the HC-trap.

A twenty-fourth aspect of the invention, well suited for use in the first embodiment and any one of the first to twenty-third aspects, is one wherein the control unit sets an extended period of time beyond a prior cold start period before returning to predominately stoichiometric exhaust flow over the HC-trap.

A twenty-fifth aspect of the invention, well suited for use in the first embodiment and any one of the first to twenty-fourth aspects, is one further comprising an engine of either a hybrid or non-hybrid form, which engine is selected from the group consisting of port-fuel injection (PFI) engines, stratified charge engines (SCE), gasoline direct engines (GDI), dual injection system engines (PFI+GDI), and gasoline direct injection compression ignition engines (GDCI).

A twenty-sixth aspect of the invention, well suited for use in the first embodiment and any one of the first to twenty-fifth aspects, is one wherein, relative to an entire length from an engine exhaust output to an exhaust release point to the atmosphere, there is lacking a designed SCR component.

A second embodiment of the present invention includes a control device for use with a predominately stoichiometric running engine, comprising a control unit which includes a signal transmitting component, with the signal transmitting component including a signaling device that retains an extended period of lean exhaust flow over an HC-trap and NOx-trap catalyst combination receiving exhaust output from the predominately stoichiometric running engine.

A third embodiment of the present invention includes a method of reducing exhaust emissions comprising passing exhaust over the exhaust treatment apparatus in the exhaust emission reduction system of the first embodiment.

A fourth embodiment of the present invention includes an underbody exhaust treatment combination for use with a predominately stoichiometric running gasoline engine, comprising an NOx-trap and HC-trap combination with the HC-trap comprising a PGM material and a metal such as one selected from the transition group (e.g., Ni, Fe, Mn, Co, Cu) and/or a P-block metal (e.g., Sn or In) or a combination of any of the same, with the underbody exhaust treatment combination being free of exhaust gas treatment influence from either a downstream or an upstream SCR.

A twenty-seventh aspect, which is well suited for use with the fourth embodiment, is one further comprising a TWC material layer.

A twenty-eighth aspect, which is well suited for use with the fourth embodiment and the twenty-seventh aspect, is one wherein the HC-trap is supported on a first support substrate together with at least one of the NOx-trap material and TWC material.

A twenty-ninth aspect, which is well suited for use with the fourth embodiment and either one of the twenty-seventh and the twenty-eighth aspects, is one further comprising a canister and wherein all three of the HCT-trap, NOx-trap, and TWC are in the canister.

A thirtieth aspect, which is well suited for use with the fourth embodiment and any one of the twenty-seventh to the twenty-ninth aspects, is one wherein the canister is free of an SCR.

A thirty-first aspect, which is well suited for use with the fourth embodiment and any one of the twenty-seventh to the thirtieth aspects, is one further comprising a substrate support and wherein all three of the HCT-trap, NOx-trap, and TWC are layered on the substrate support.

Also, while reference is made to above to various aspects and embodiment combinations above, the present invention is inclusive of all compatible combinations and sub-combinations relative to the various embodiments and aspects set out above and below.

DETAILED DESCRIPTION OF THE DRAWINGS

Figure 1:
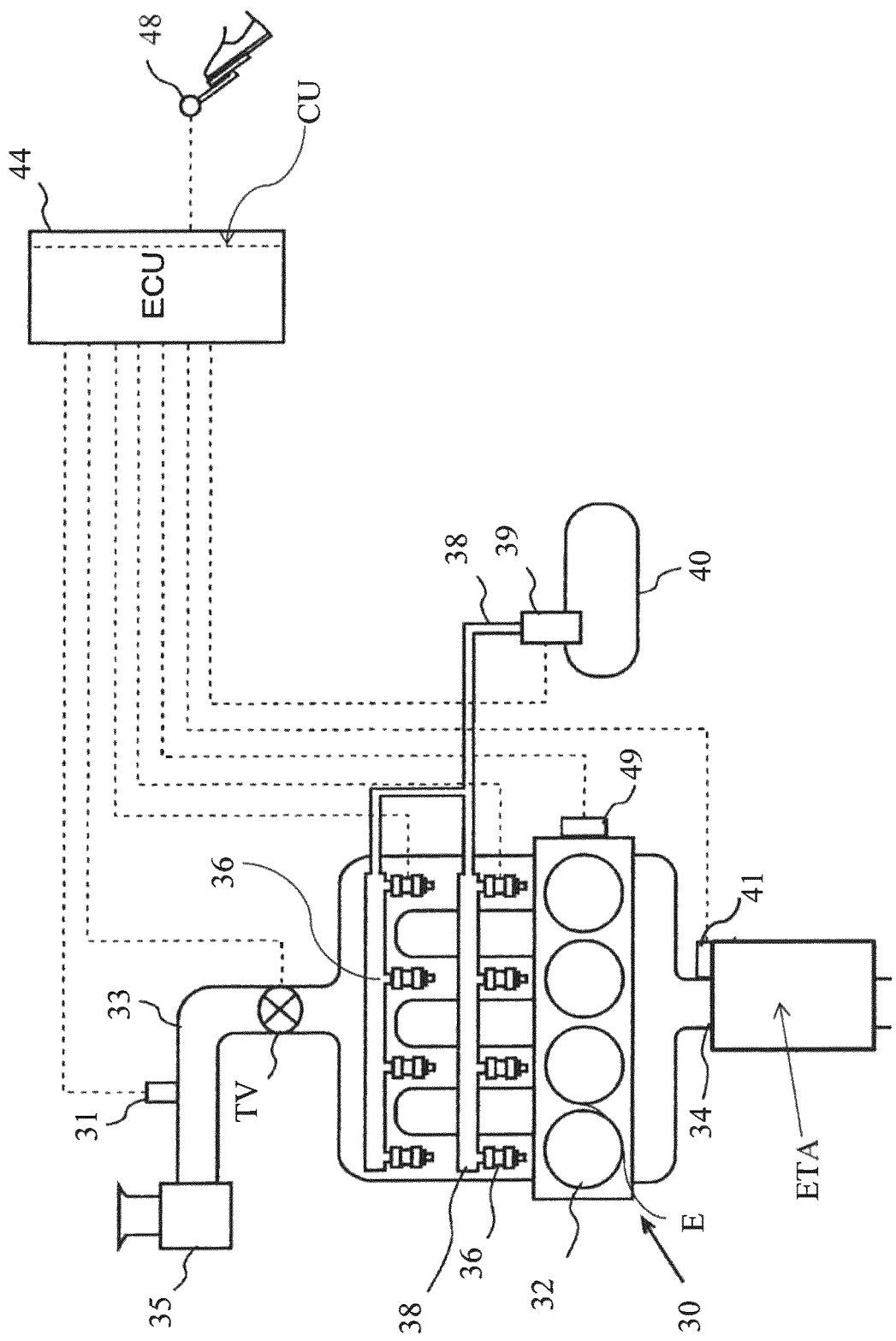
FIG. 1 shows a schematic illustration of an exhaust emission system, with a provided, generic "box" depiction of an exhaust treatment apparatus (ETA) forming a part of the exhaust emission system, and with the exhaust emission system further comprising the schematically shown gasoline engine (with associated controls and sensors).

The present invention is directed at avoiding or alleviating at least some of the deficiencies associated with the conventional approaches to exhaust emission treatment. To facilitate an understanding of features under the present invention, an illustrative exhaust emission system 30 is shown schematically in FIG. 1. As seen in FIG. 1, exhaust emission system 30 of the present invention includes internal combustion engine E to which the emissions treatment system or exhaust treatment apparatus (ETA) of the present invention is connected. The FIG. 1 example features a gasoline internal combustion engine E. The illustrated engine E can be utilized as a vehicle's sole major power source or can represent an engine provided with one or more additional major power sources, as in a hybrid vehicle having an electric motor/fuel engine combination. The present invention is also well suited for use with vehicles having a "start-stop" system (or also referenced as a "stop-start" system) that automatically shuts down and restarts the internal combustion engine to reduce the amount of time the engine spends idling, thereby reducing fuel consumption and emissions. Such start-stop systems include ones found on non-hybrid vehicles as well as hybrid vehicles which can benefit from the shut-down of an idling vehicle. Such start-stop systems receive sensed information based on sensor input to, for example, the vehicle engine control unit (ECU) whereupon a sensed idling vehicle (e.g., 0 mph sensed) can be shut down until operator activity suggests a desire to proceed again as in an accelerator pressing.

Thus, internal combustion engine E can take on a variety of forms (that can be benefited by the ETA of the present invention) with some examples including internal combustion engines that are operated with a predominantly stoichiometric air/fuel (A/F) mixture. Non-limiting examples include internal combustion gasoline engines as in port-fuel injection (PFI) engines, stratified charge engines (SCE) and gasoline direct engines (GDI). Additional examples of suitable gasoline combustion engines include dual injection system engines (PFI+GDI) and gasoline direct injection compression ignition engines (GDCI) which GDCI's operate cold and have extremely delayed light off. These types of gasoline engines run predominately at stoichiometric air/fuel mixtures inclusive of mixed mode operating vehicles such as GDCI's which, at low and medium loads, can operate very lean, while at heavier loads run predominately stoichiometric (the latter being suited for control unit CU manipulation in accordance with the present invention as it represents an example where the normal calibrated run of the engine is modified by the CU of the present invention to improve on removal of desorbing HC's previously accumulated on the HCT).

These types of gasoline engines also typically have their air/fuel ratios finely calibrated relative to the desired predominately stoichiometric running in accordance with sensed operating conditions. This calibration includes, in general terms, toggling between slightly rich and slightly lean depending on the current needs and limitations (e.g., a $\lambda$ toggling such as 0.97 to 1.03) inclusive of togging between extended periods of stoichiometric running. It is also noted that the amplitude for such rich/lean toggle cycling generally is a function of engine load in most cases, and thus varies. Most modern lambda calibrations also shut off the injectors during deceleration phases (i.e., Deceleration Fuel Cut Off, "DFCO").

In the embodiment shown in FIG. 1, engine E is shown as a spark-ignition internal combustion engine having a plurality of cylinders 32. While the internal combustion engine shown in FIG. 1 has four cylinders 32, the number of the cylinders may be three or less or five or more (e.g., 1, 2, 4, 6, 8 or 12 as engine examples featured in the present invention). Internal combustion engine E is connected with an air intake passage 33 and an exhaust passage 34. The intake passage 33 is a passage used to deliver fresh (typically ambient) air taken from the atmosphere to the cylinders 32 of the internal combustion engine E. The intake passage 33 is provided with an air cleaner 35. The intake passage 33 is further provided with an air flow meter 31 at a location downstream of the air cleaner 35. The air flow meter 31 outputs an electrical signal correlating with the quantity (or mass) of air flowing in the intake passage 33, which electrical signal is received by engine control unit 44. The intake passage 33 is provided with a throttle valve TV at a location downstream of the air flow meter 31. The throttle valve TV is in control communication with ECU 44 and varies the quantity of air supplied to the internal combustion engine E by varying the channel cross sectional area of the intake passage 33 as per instructions from the ECU. This increase in the air flow to the engine, via an adjustment in throttle valve TV, is one potential technique for calibrating from a rich or stoichiometric air-fuel flow setting to a lean air-fuel flow setting. Alternate approaches include the reduction of fuel to the engine to achieve a leaner exhaust output or a combination of added air and reduced fuel to achieve a $\lambda$ value of greater than 1.

The intake passage 33 downstream of the throttle valve TV forks into four branch pipes, which are connected to the cylinders 32, respectively. To each branch pipe of the intake passage 33 is attached a row of fuel injection valves 36 injecting fuel (e.g., gasoline, with or without supplements such as ethanol) into the respective cylinders. Fuel injection valves 36 are in fluid communication with fuel delivery pipe 38, which is in line with fuel pump 39 sourcing from fuel tank 40.

The gasoline stored in fuel tank 40 is supplied to the delivery pipe 38 via the fuel pump 39, and then distributed to the four first fuel injection valves 36 from the first delivery pipe 38. The respective fuel valves are in flow control communication with ECU 44, as is fuel pump 39. In other words, fuel pump 39 pumps the gasoline drawn from tank 40 for injection directly or indirectly into the respective cylinders (with the injection valves 36 being schematically shown, as their outputs can be at different locations relative to the cylinders 32 and the respective cylinder in-feeds, as determined by the type of engine (e.g., GDI, stratified charge engines (SCE) or PFI)).

The exhaust passage 34 is a passage used to cause burned gas (exhaust gas) discharged from the cylinders 32 to be emitted to the atmosphere after passing through exhaust gas purification device or exhaust treatment apparatus (ETA) of the present invention. Sensor apparatus 41 (typically one or many sensors of the same or different types feeding information to the ECU (and/or CU) and used to monitor ETA status and typically provided at multiple positions in the exhaust passage) is generically represented in this embodiment. Sensor apparatus 41 is preferably inclusive of an air/fuel equivalence ratio or A/F sensing means that, for example, outputs electrical signals, correlating with the air-fuel ratio of the measured region of the exhaust passage 34, to ECU 44 and/or CU. For example, the A/F sensor outputs an electrical signal for determining the current $\lambda$ value in the exhaust, and can take on a variety of sensing means such as an oxygen sensor with associated voltage meter and can be positioned at one or more strategic positions relative to the exhaust passageway leading from the engine outlet to an exhaust conduit outlet to the environment. As some examples of suitable sensors reference is made to UEGO's Universal Exhaust Gas Oxygen sensor (a.k.a. LSU) and HEGO's Heated Exhaust Gas Oxygen sensor (a.k.a. LSF). A UEGO or HEGO may be present in the engine out or pre-catalyst position. HEGO's output a voltage (0-1V) and are designed mainly to indicate whether an engine system is operating rich or lean of stoichiometric, but are also capable of measuring air fuel ratios (AFR) very close to stoichiometric at a high resolution. One type of UEGO outputs varying current (based on varying internal resistance), which helps correlate with an exact lambda. The upstream UEGO or HEGO can be used as the main control feedback in many cases. HEGO's are often present in the catalyst downstream position and are used for catalyst monitoring and very fine fueling adjustments (i.e., fuel trim). Usage of either or both of UEGO sensor(s) and HEGO sensor(s) are featured in embodiments of sensor apparatus 41 and facilitates operation of the below described present invention control unit CU modifications to facilitate providing sufficient oxygen levels in the exhaust during HCT desorption.

FIG. 1 further illustrates internal combustion engine E in control communication with electronic control unit ECU 44.

ECU 44 is configured to receive present data as in sensor data inputs and adjust system 30 operation (e.g., fuel injection) to have the engine E run in a desired present mode. ECU 44 is shown in this example as an electronic control unit composed of, for example, a CPU, a ROM, a RAM, and a backup RAM, etc. As shown by the dashed lines in FIG. 1, ECU 44 is preferably electrically connected with various sensors such as an accelerator status sensor 48, crank position sensor 49, air flow meter 31, etc. The accelerator status sensor 48 is shown as a sensor that outputs an electrical signal correlating with the position of the accelerator pedal (accelerator opening degree). The crank position sensor 49 is a sensor that outputs an electrical signal correlating with the rotational position of the crankshaft of the internal combustion engine E.

ECU 44 controls the above-mentioned various components based on signal outputs from the above-mentioned various sensors. The ECU 44 is, in the illustrated embodiment, designed to control the relative on/off and duration states of the fuel injection valves 36 such that there is provided for independent control as to which injector(s) 36 are feeding fuel into the cylinders and which injector(s) 36 are not, as well as the length of time of such respective fuel feed(s), which enables a calibrated approach to the overall air/fuel ratio under which the engine is operating at any given time.

At least some of the above described sensors, inputting to the ECU traditionally, play a role in engine-out oxygen level adjustments such as the above described engine control programs to enhance emission system efficiency. As explained in greater detail below, the FIG. 1 control unit CU is designed to strategically provide lean exhaust output in the exhaust emission system during a time period of HC desorption from a hydrocarbon trap of the ETA. FIG. 1 shows an embodiment of the invention featuring control unit CU (which is a controller that is designed for use with the ETA of the present invention and is comprised of, for example, a CPU, a ROM, a RAM, and a backup RAM, etc., which components of the CU can be shared or independent components relative to ECU 44). Thus, in the embodiment of FIG. 1, control unit CU is depicted as a sub-part of the ECU 44. The illustrated CU, as a sub-part of ECU 44, provides the advantage of being able to utilize sensor inputs being fed to the ECU 44 that are also pertinent in conjunction with the CU providing a strategic lean running period relative to the ETA during the aforementioned desorption of an HC-trap, such as that which occurs following cold start adsorption of HCs by the HC-trap.

The control unit CU is designed on the basis of a determination that the HC emission reduction for an HCT (in the ETA) used to adsorb cold start HCs and located in an UB exhaust position is highly dependent upon the availability of oxygen during the HC desorption phase. In other words, in order for the desorbing HC's to be efficiently converted into $H_2O$ and $CO_2$, oxygen must be available for oxidation. However, for typical modern calibrated vehicles; lean operation (if present) after initial startup is short and does not extend into the HC desorption phase of the HC-trap. HC desorption typically occurs when the trap in the UB location reaches, in some emission systems, a relatively cooler 200° C. temperature at the HC-trap outlet; or in some, less cooler or higher temperature HC desorption start emission systems, an HCT inlet gas temperature T of at least 200° C., with some systems involving even higher temperatures, as in an inlet HCT temperature of 300° C. or higher for desorption. It is further noted that the desorption temperature is different depending on how there is measured the trapping efficiency of the trap. For a dynamometer emission test HC desorption (wherein previously heated gas is rechanneled from a bypass line into contact with a room temperature HCT) can be seen as starting to develop as high as 300-330° C. For an FTP test (wherein both the exhaust gas and HCT heat up together) the HCT can be seen initiating desorption at temperatures even below 200° C. Thus, a general range for the desorption start temperature (that takes into consideration the nature of the species formed on the trap surface and the test method) is about 150-400° C. Furthermore, by the time of HC desorption, (e.g., 50-150 seconds into the FTP test), the calibration on the vehicle is either at or close to stoichiometry and/or all oxygen has been essentially consumed by the combustion of HCs and CO over the close-coupled catalysts. In the absence of the features of the present invention, this results in no or too little oxygen being available during the rapid release of HCs during the HC desorption phase from the HCT. This lack of oxygen is problematic even with higher temperatures having been reached in the system.

The ETA of the present invention includes a combination HC-trap and NOx-trap ("TRAP"). While any standard HCT (that is capable of the HC adsorbing/desorbing cycle described) is suitable for use with the present invention's control system and LNT combination, preferred embodiments contemplated under the present invention include catalyzed HC-traps that are highly effective at trapping HCs when located in the underbody UB location. This includes HC-traps that are capable of trapping 60% or greater (e.g., at least 70%) of the HC passing over the HCT component of the TRAP as during cold start when, for example, an upstream $TWC_{cc}$ is not yet running efficiently due to the cold start lower temperature conditions. The HCT of the present invention is thus designed as to capture essentially all alkenes, aromatics and potentially some large alkanes (as to achieve the 70% or greater capture amount). Relative to this capture rate of the HCT there is noted the potential of some small alkanes passing through the HCT for downstream treatment, preferably. The NOx-trap under the ETA of the present invention is configured to accommodate for any excess generation of NOx due to the invention's CU lean run calibration during the period of HC desorption of the HCT, and the NOx-trap is also designed to readily reduce any released (previously trapped) NOx upon the CU switching off the lean run mode and providing for a stoichiometric or rich run period as dictated by the ECU (e.g., switching over to normal predominantly stoichiometric running of the engine E).

Accordingly, the present invention provides an exhaust treatment apparatus ETA that is configured for enhanced conversion of previously cold start adsorbed hydrocarbons (HC) that are released upon the HCT reaching a desorption state. The ETA is particularly well suited for use in combination with a strategic lean operation calibration control unit (CU). The ETA is preferably a catalyst system that features an HC—$NO_x$ trap combination or TRAP (for example an HCT and LNT combination) that is configured for running under lean operation conditions, as controlled by the CU, during a pertinent period of HCT desorption of previously trapped cold start HCs. Embodiments of the ETA under the present invention comprise HCT-LNT combinations, such as HCT-LNT underbody (UB) combinations that, preferably, operate together with one or more close coupled three-way catalytic (TWC) converters designed for initial treatment of the three primary components (HC/$NO_x$/CO) of exhaust generated by engine E while operating under generally stoichiometric running conditions. Further the HCT is preferably a catalyzed HCT as in one that features PGM loading (e.g., Pd only) preferably also in combination with a TWC such as one in an underbody upstream or downstream location and/or as a coating directly on the HCT. The TWC in such situations is preferably provided with a PGM of Rh or Pd and Rh. Thus, under embodiments of the invention, the ETA includes one or more additional TWC(s) converters (TWC layering or standalone TWC devices) that are in an underbody (UB) position and work together with an HCT-LNT combination as to form a TWC-HCT-LNT combination as the TRAP, although embodiments of the invention also include ETA's free of a $TWC_{cc}$, free of a $TWC_{uf}$, or free of a TWC at either location.

Figure 3:
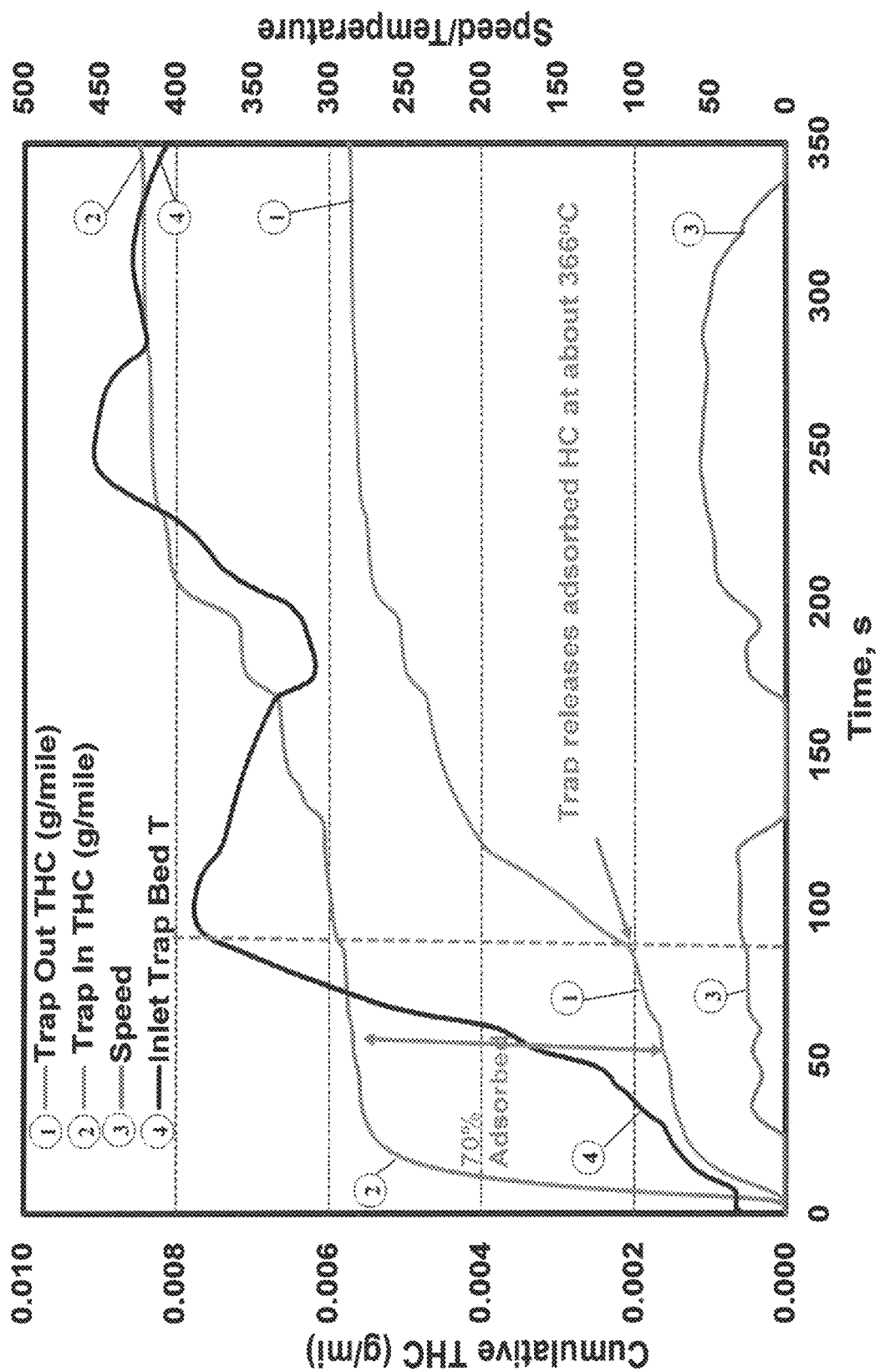
FIG. 3 shows a graph of cumulative total hydrocarbon (THC) values (based on trap-in and trap-out THC values) as well as the inlet trap temperature for an operating hydrocarbon trap placed in-line in an exhaust catalyst system under an EPA's Federal Testing Program (FTP-75) ("FTP") analysis, with associated time and engine speed.
Figure 14:
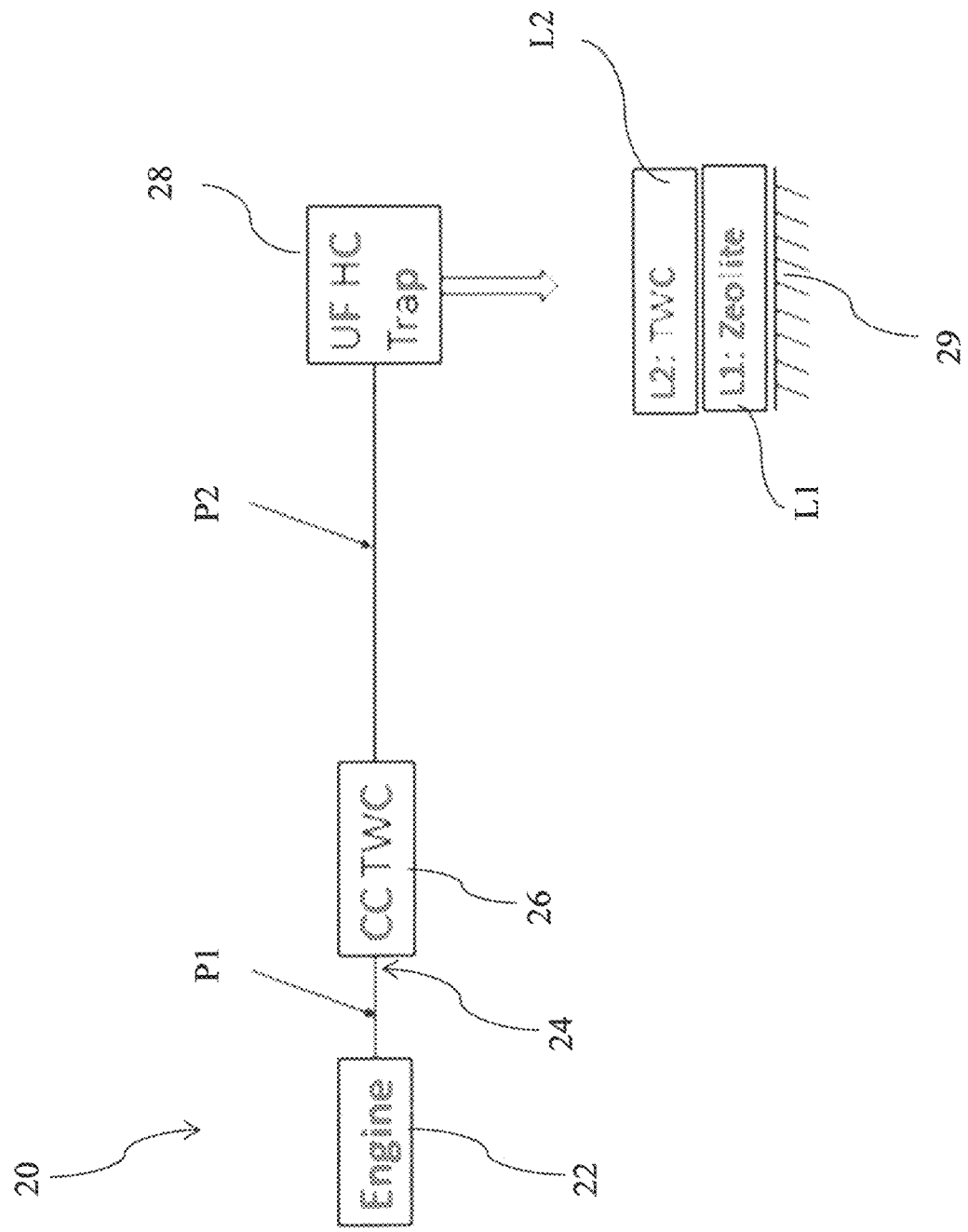
FIG. 14 shows a schematic view of a conventional approach of removing pollutants from an exhaust flow as well as a catalyst and substrate layering schematic for the $HCT_{uf}$ shown.

To better appreciate the ability of the present invention to address the difficult areas relative to regulated emission controls such as the LEVIII, reference is made to FIG. 3 which shows a graph of cumulative total hydrocarbon (THC) values (HC-trap in and HC-trap out THC) as well as the inlet trap temperature (° C.) for an operating hydrocarbon trap. The FIG. 3 HCT (referenced herein as "CAT-HCT") was placed in line in an exhaust catalyst under an EPA's Federal Testing Program (FTP-75) ("FTP") analysis (with associated time and engine speed (miles per hour)). The data presented in FIG. 3 is based on an emission system set up such as that presented in FIG. 14 inclusive of a $TWC_{cc}$ upstream of the catalyzed HCT. A tested example catalyzed HCT or CAT-HCT includes the below described HCT layer supplied as a washcoat layer to a support substrate. The CAT-HCT includes a HC-trap layer that was formed by first preparing a slurry beginning with the addition of an alumina stabilized Silica sol from Evonik Industries AG called AEROPERL 3375/20 to water and mixing. This material represents 4.5 wt % of the final calcined washcoat "WC" loading. This step was followed by the addition of a boehmite, SASOL SCF-55 and Fe nitrate at contents of 1.0 and 4.5 wt % respectively of the final calcined washcoat. Finally the beta zeolite in the ammonium form and having a SAR value of 25 was added and the slurry aged for two days. Accordingly, this example, having a SAR value of 25, is illustrative of a suitable SAR value under the present invention which preferably utilizes Zeolites having SAR values of 5-500 and more preferably SAR values of 15-100.) This slurry was then coated onto a ceramic substrate have 400 cpsi/6.5 mill cell structure and 4" round by 6" long giving a total volume of 1.2 Liters and a WC load of 3.64 $g/in^3$ or 220 grams/Liter.

The CAT-HCT includes a TWC overcoat as to render the HCT a (TWC) catalyzed HCT. The TWC overcoat was provided by a washcoat process as well. That is, after application of the HC-trap layer, the TWC layer was prepared and applied to the HC-trap layer and consisted of alumina stabilized with 4% by weight of lanthanum oxide, barium sulfate and a mixed oxide oxygen storage material with a composition of 68.5% $ZrO_2+HfO_2$, 24% $CeO_2$, 4% $Y_2O_3$ and 3.5% $La_2O_3$.

A slurry was prepared by first adding alumina to demineralized water and milling (using a Sweco type mill) such that the d50 was 5.5-6.5 microns and the d90 was 12-20 microns. BaSO4 was then added while stirring followed by La(CH3CO2)3 (lanthanum acetate) and the oxygen storage (OS) material. Nitric acid was co-added so as to maintain a pH of 5.0-7.5 during the OS material addition. This slurry was stirred for 20 minutes and then milled a second time such that the d50 was 4.1-4.9 microns and the d90 was 10.5-18.5 microns. The slurry was then weighed and the LOI (loss on ignition) measured at 540° C. to determine the total calcined solids content. Based on this value the weight of Pd and Rh solution needed was calculated. Rh nitrate solution was then added to the slurry dropwise while stirring. After one hour the Pd solution was subsequently added dropwise while stirring. During the Pd solution addition, TEAOH (Tetra-ethyl-ammonium Hydroxide 35% solution) was co-added to prevent the slurry pH from going below 3.0-3.5. After all the Pd was added the pH was adjusted to a final value 5.2-5.5.

After slurry preparation, the TWC WC had a specific gravity or density of 1.20-1.40. This WC was then applied to the honeycomb ceramic monolith that contained the HCT layer using a mechanical piston coater. The slurry completely filled the ceramic channels for a brief period and then evacuated first by the piston retraction and then using a vacuum (75-250 millibar) to clear and remove any excess material so as to obtain the desired targeted loading. Washcoat loading was controlled by varying specific gravity, and other coating parameters such as vacuum time. After applying the washcoat, the parts were calcined at 540° C. for 2 hours. After calcination the composition of the TWC catalytic layer was as follows:

40.7 g/l Lanthanum-stabilized alumina;
40.7 g/l oxygen storage material;
9.8 g/l Barium sulfate;
0.352-2.65 g/l Rhodium; and
0.2-7.5 g/l Palladium.

Thus, the above described coating process (for forming the HCT used in the FIGS. 3 and 4 testing) provides a catalyzed HCT from the standpoint that there is provided a TWC coating with PGM on a substrate with an HCT coating. A catalyzed HCT of this type is suitable for use under the present invention in combination with the CU and LNT, but preferred embodiments (below described) include catalyzing the HCT through inclusion of PGM in the HCT material itself (with or without an added TWC overcoating). These additional embodiments of catalyzed HCT are described in greater detail below; but, in any event, FIGS. 3 and 4 show how oxygen levels are depleted at a point upstream of the HCT at initiation of HC desorption from the HCT under normal run modes in the noted gasoline engines regardless of the HCT configuration.

The test system and vehicle engine sourcing the exhaust are described as follows:
Vehicle:
  2014 VW Jetta Hybrid
  1.4 L GTDI
  PZEV certified
System Description:
  Close coupled "CC" TWC as: UTC1003 @ 0/156/4 g/cu.ft. (Pt/Pd/Rh) 4.16"×4.50" (1.0 L vol.) 900/2.5 cpsi/wall thickness (mils)
  Underfloor "UF": CAT-HCT@ 0/44/4 g/cu.ft. (Pt/Pd/Rh) 4.66"×4.50" (1.26 L vol.) 600/4.5 cpsi/wall thickness (mils)
Aging:
  CC: GMAC875 (925° C. steady state, 980° C. peak), 37 hrs.
  UF: Steady state rich w/air injection, 800° C. Fbed temperature, 6 hrs The data plotted in FIG. 3 shows that, when there is compared the HC going into the HCT and the HC coming out of the HCT, up to 70% of the HC is removed during cold start. However, further in time under the FTP test, there is seen that, at about 85 seconds, the HC is being released without being fully converted. In other words the CAT-HCT in the underfloor position is quite effective at adsorbing the HCs during cold start, but is shown to release HCs without conversion after 87 seconds into the FTP test, which is at a time when the inlet HCT temperature is quite hot (inlet trap bed temperature shown to be 366° C.). It is noted that, based on the general assumptions associated with the desorption and conversion of HCs in an HCT, this lack of HC conversion at this temperature level is surprising, That is, at the noted time point at about 85 seconds, the inlet gas temperature at the trap is over 350° C. (366° C.). At this temperature it would be expected that the trap is sufficiently hot enough to convert the HC (e.g., see the earlier discussion as to desorption starting out on HCT outlet temperature of 200° C. in some other systems and testing methods). This is not the case, however, as seen by the graphed lack of conversion of desorbed HCs in the below described FIG. 4.

Figure 4:
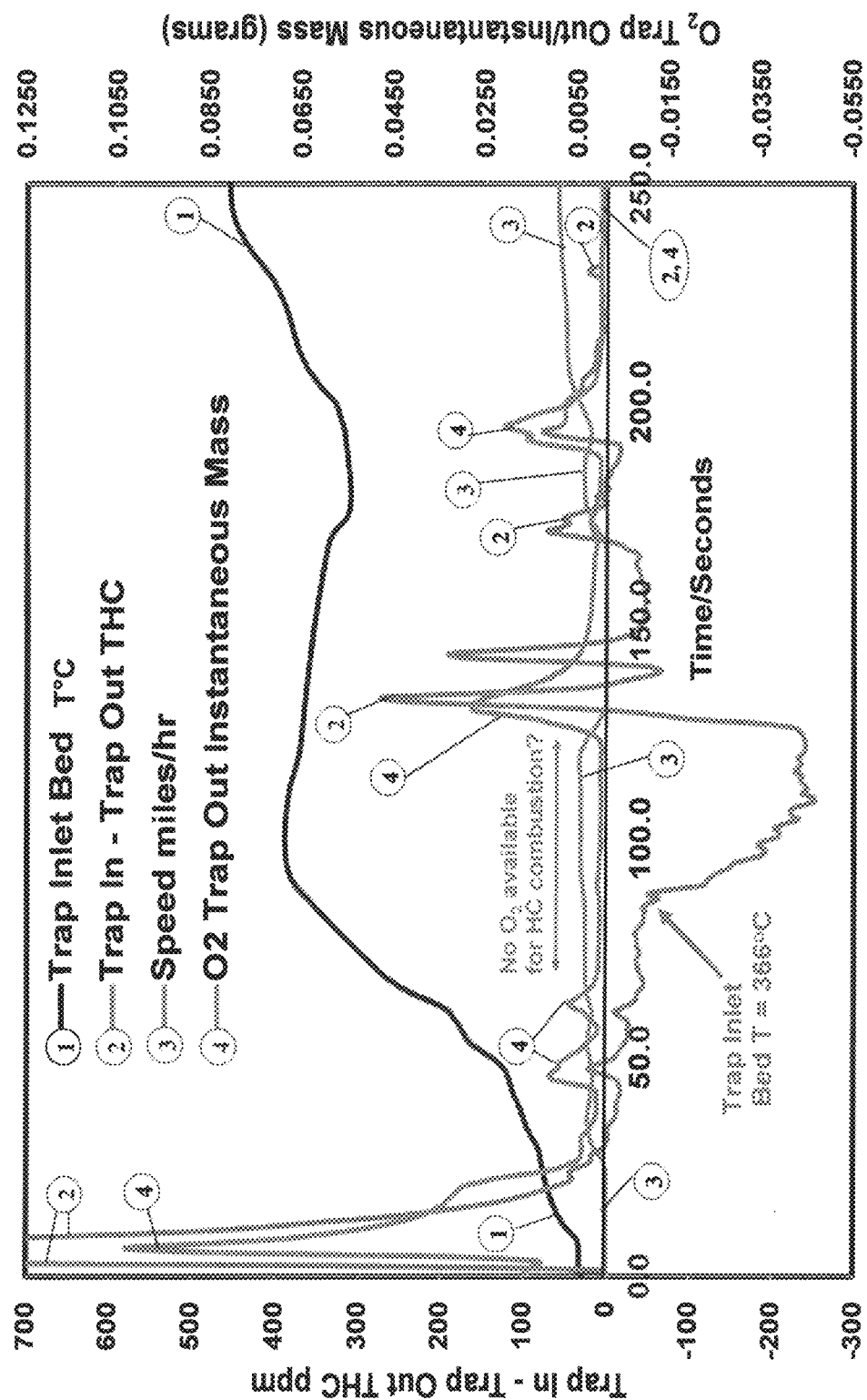
FIG. 4 shows a graph depicting oxygen availability levels ($O_2$ trap out-instantaneous mass in grams) and the cumulative total hydrocarbon values at inlet trap temperatures for an operating HCT placed in-line in an exhaust catalyst under the FTP analysis, with associated time and engine speed.

That is, FIG. 4 shows a graph showing cumulative total hydrocarbon values at the trap inlet and trap outlet, HCT inlet bed temperature, and $O_2$ trap out instantaneous mass (grams). FIG. 4 also shows the associated time and engine speed for the FTP analysis carried out. The FIG. 4 data test configuration included the above described TWC catalyzed HCT together with a $TWC_{cc}$. The test vehicle was the referenced 2014 VW Jetta Hybrid 1.4 L GTDI.

The data provided in FIG. 4 is considered to provide insight as to why the HC is not being converted/oxidized. That is, a plotting of the instantaneous oxygen concentration in FIG. 4, over the same time period of FTP operation, shows that there is a period where there is no measurable (or essentially no <100 ppm) oxygen in the exhaust, which period of no (or essentially no) oxygen extends over most of the time during which desorption of the HC is shown occurring. That is, FIG. 4 shows a period of desorption extending from about 50 to 130 seconds, with an extended period subset within this desorption range wherein there is no, or essentially no, oxygen available. This no or essentially no oxygen availability is shown in FIG. 4 as continuously extending from about 70 to 120 seconds. There is noted that during the general desorption time period occurring during the FTP testing there are a couple of time increments wherein there is a mild fuel cut off or FC, (in other words, the analyzed vehicle is calibrated to have fuel cuts during the FTP and thus an increase in oxygen content in the exhaust). During these fuel cut time increments there is seen HC conversion as evidenced by the positive numbers for the HCT-in-HCT-out graphing. In particular at around 120 seconds during the FTP there is seen a large spike in the oxygen content in the exhaust. As also seen, however, the FC is only temporary and the fuel cut mode is quickly switched back as the FTP cycling reverts back to a fuel supply mode (e.g., less than 15 seconds for a full rise and fall of the $O_2$ available spike based on a fuel cut). Accordingly, these FTP driven fuel cuts are not suited or designed to achieve the HC reductions featured under the present invention (as also illustrated by the THC levels featured in FIGS. 3 and 4 under the FTP program). The FTP also shows having fuel rich modes as to approximate vehicle acceleration demands during a driving cycle.

As described in greater detail below, the present invention provides a combination or coupling of an HC-trap and NOx trap (HC-NOx trap combination) that works with a control unit that controls (e.g., either through modeling and/or through sensed parameters) the period of lean exhaust gas supply that is supplied within a desorption region of the HCT. The control unit's controlled lean exhaust gas supply operation is designed to work well with the HC-NOx trap combination and thus provides means to avoid the situation where there is a period of desorption, but insufficient HC conversion due to the lack of a sufficient oxygen supply during the desorption period. Further, the arrangement of the HC-NOx trap combination is well suited for trapping any excess NOx produced as a result of an extended lean operation during a period of desorption (wherein there is sufficient $O_2$ supply to accommodate the HC conversion requirements, but also sufficient $O_2$ to potentially increase the NOx presence in the exhaust passing within the exhaust passageway). The HC-NOx trap combination of the present invention is well suited to avoid excess NOx release to the atmosphere with a goal of meeting even the more stringent requirements imposed in the noted regulations such as the LEVIII California regulations under a wide variety of different system arrangements and environmental conditions.

The removal of NOx through use of the present invention HC-NOx trap combination can take on a variety of forms inclusive of an upstream (although still preferably under body positioned) removal of NOx via an NOx-trap component of the TRAP, with the goal of having any NOx passing downstream of the upstream removal still being within the noted regulation caps. Alternatively, the NOx-trap can remove NOx at a location coincident with that of the HCT or downstream thereof, again with the goal of avoiding exceeding the regulatory caps described above such as for the LEVIII. Accordingly, the inclusion of a HC-trap before a NOx trap in the above phrase "HC-NOx trap" should not be misconstrued as limiting the HC-NOx trap combination to one that requires an upstream HCT relative to the NOx trap, although that is one possibility.

The inventive scope includes an ETA having a combination HC-trap (or HCT) and NOx trap as its TRAP components, with the combined HC-trap and NOx trap being associated in the same emission system inclusive of having some or all of the TRAP components (e.g., HCT, LNT, $TWC_{uf}$) within the same converter canister and on different substrate support "bricks" and more preferably at least two (e.g., three) TRAP components on the same monolithic substrate support (layered and/or zoned). For example, in addition to the HCT and LNT TRAP two components, a suitable third TRAP component includes a TWC (e.g., a TWC layer arranged with one or both of the LNT and $NO_x$-trap components or a standalone $TWC_{uf}$ catalyst device). Also the ETA of the present invention includes one that is free of an upstream $TWC_{cc}$ with, for example, reliance placed on a catalyzed NOx trap for dual functioning as a NOx trap component during cold start and a TWC functioning component when the exhaust temperature is sufficiently high enough for the NOx trap to perform a TWC operation. However, the present invention also is well suited for use with one or more upstream TWCs as the lean calibration control under the method of the present invention is particularly adept as supplying, for example, a proper oxygen content for the removal of desorbed HC's, when the oxygen level is lowered by a high functioning TWC(s) upstream.

Accordingly, alternate embodiments feature the presence of one or more upstream TWC(s) (e.g., a standalone $TWC_{cc}$) with a catalyzed or non-catalyzed HCT component of the HC-NOx trap combination downstream.

Further the present invention is designed as to avoid the need of a dedicated SCR component (e.g., anywhere along the exhaust gas path to the environment) and thus deviates from the prior art approaches that rely on one or more SCRs to control against the release of NOx.

Figure 5:
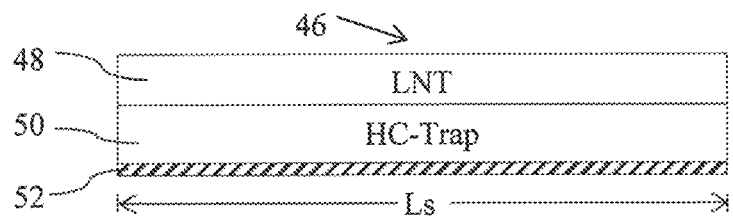
FIG. 5 shows a catalyst system falling under the scope of the present invention and featuring a layered NOx trap/HCT (or LNT/HCT) as the TRAP, which TRAP is well suited for use with an air/fuel calibration control unit of the present invention.

A number of configurations can be considered for the combined utilization or coupling of the HC and NOx traps in the ETA. Examples of such possible configurations are outlined in FIGS. 5 to 13. A particularly well suited configuration for many environments featured under the present invention includes a configuration where there is a layered and/or zoned single brick so as to economize on volume, material (the need for one brick rather than two), and faster heat up of all components (e.g., see the single brick or coated monolithic substrate embodiments shown in FIG. 5 and FIGS. 9 to 13). For example, a LNT that also has a high level TWC activity under the configuration in FIG. 5 is an efficient configuration (e.g., a configuration that has the least number of coating steps and the TWC/LNT combination can heat up and become more active faster). Also the trap length would be maximum for trapping HCs as there is avoided zoning of the bottom HCT layer. However, certain system requirements also render other embodiments desirable such as those described and/or illustrated herein.

Examples of embodiments falling under the scope of the invention include all components of each of the catalyst systems in FIGS. 5 to 13 being in a preferred underfloor or UB position, preferably with one or more upstream catalysts, as in close coupled or CC positioned catalysts such as those with PGM(s) loading. Examples of such ETA upstream components including one or more close coupled TWCs.

Also, relative to the illustrated ETA arrangements under the present invention, those ETA's represented can be defined by only the components described or can include added exhaust emission control components as in particle filters (PF) for the gasoline exhaust (as in a wall flow PF alone or in conjunction with (e.g., carrying) one of the noted LNT, NOx trap, TWC components of the ETA). Further, as noted above, in preferred embodiments of the present invention there are featured overall catalyst systems that are free of a SCR dedicated catalyst, as ETA arrangements of the present invention function adequately without the need for a dedicated SCR catalyst (e.g., SCR designed catalyst).

Further, in many uses of the ETA under the present invention, there can be provided a PGM loaded CC catalyst, since many HC-traps are ill suited to survive the temperatures reached in the CC position. The maximum continuous operating temperature (T) for many HCTs that work well under the present invention is about 800° C. with some limited T spikes to <850° C. Further, an HC-trap (or catalyzed HCT) is distinguishable from a SCR, as the HC-trap preferably has PGM (even when having some common material with respect to an SCR, such as zeolites). PGM loading is avoided in SCR catalysts due to the degrading impact on SCR functionality. For example, the HCT of the present invention is preferably loaded with a PGM, with Pd being preferable as it is well suited to promote alkene trapping. As noted, PGMs are avoided in SCR catalysts as PGM's are very toxic for SCRs as they rapidly oxidize ammonia to NOx. Further preferred embodiments also feature the HCT having one or more P-block metals (e.g., In or Sn) and/or one or more transition metals such as those selected from the group consisting of Ni, Fe, Mn, Co, and Cu, with Fe being particularly well suited for the purposes of the present invention (e.g., cold start HCT trapping and subsequent lean environment HC desorption conversion). The contents of the noted P-block and/or transition metal is preferably 1.0 and 10.0 wt % of the final calcined HCT washcoat, and more preferably 2.0 to 6.0 wt % of the final calcined HCT washcoat.

In the schematic depictions below there is featured in each instance an HCT, and while this HCT can include standard forms providing the above described HC adsorption/desorption cycling without catalyzation, a preferred embodiment features an internally catalyzed HCT having PGM material associated therewith (whether or not also being a catalyzed HCT based on a TWC coating, for example). Reference is made to the above description of washcoat loading a non-internally PGM catalyzed HCT (includes Fe without PGM), which is suitable for use under the present invention, although a more preferred embodiment features PGM material added to the HCT material (preferably while retaining the transition and/or P-block metal). For example, the same slurry preparation and washcoat application that was carried out for the above described CAT-HCT can be carried out together with an additional step of PGM (Pd in this example) inclusion. This CAT-HCT with PGM example is summarized below as one example of how to render the HCT inclusive of PGM material (e.g., a zeolite and PGM combination). Examples of suitable loading amounts of Pd for the HCT include washcoat loadings of 5-100 g/ft$^3$, and more preferably 15-50 g/ft$^3$.

Slurry preparation begins with addition of a commercially available alumina stabilized silica sol to water and mixing. This material represents 4.5 wt. % of the final calcined washcoat loading. This step was followed by the addition of a commercially available boehmite and iron nitrate at contents of 1.0 and 4.5 wt. % respectively of the final calcined washcoat. A beta zeolite in the ammonium form and having a SAR value of 25 was then added and the slurry aged for two days. To this slurry was slowly added Pd nitrate solution one hour before coating. This slurry was then coated onto a ceramic substrate at a washcoat load of 3.64 g/in$^3$ or 222 g/L.

In the schematic depictions in FIGS. 5 to 13 horizontal, elongated rectangular boxes are provided to designate a layering of material (as in a washcoat application wherein a prior layer is dried (entirely or substantially) and another washcoat layer is applied there-over using standard washcoat applications techniques). Layering under the present invention is inclusive of generally distinct material layers without a high degree of intermingling, or diffused layers wherein an over-layer intermingles with an underlying layer to greater than 25% of thickness. In multiple embodiments of the invention there is a preference to limit or avoid any intermingling at all to the extent possible under, for example, washcoating technology, if utilized. Furthermore, embodiments of the invention include the inclusion of a barrier layer as in a thin (e.g., 0.5 to 2.0 g/in$^3$) layer, as in an alumina barrier layer between. Such barrier layer providing is helpful to some extent in avoiding undesired intermingling. For example, the intermingling of the HC-trap layer and TWC or NOx trap layer material can represent, in some instances, a significant problem. For instance, zeolites are very toxic to TWC functionality and thus such barrier layers can help avoid HCT zeolites (when zeolites are utilized) intermingling with an adjacent TWC layer.

Further, when TWC material is utilized in the TRAP, preferred embodiments feature ensuring a sufficient amount of loading to satisfy the TRAP lean calibration requirements under the present invention. That is, when utilized, there is utilized a sufficient loading of TWC to have enough TWC activity together with a sufficient loading of HCT material to achieve a sufficient amount of HCT trapping efficiency under the extended lean conditions provided by the control unit CU. For example, a good balance is considered to be having a TWC loading of 2.2 g/in$^3$ or 134 g/L and an HCT loading of 3.0 g/in$^3$ or 183 g/L giving a total of 5.2 g/in$^3$ or 320 g/L). TWC washcoat loading ranges of 0.5-3.0 g/in$^3$ and HCT washcoat loadings of 1.0-5.0 g/in$^3$ are preferred, with more preferred loading ranges of 1.5-2.5 g/in$^3$ for the TWC and HCT loadings of 3.0-4.5 g/in$^3$).

The schematic depictions in FIGS. 5 to 13 show interconnecting horizontal line designations between individual or stacked rectangular layers to designate an upstream-downstream arrangement as by way of separate substrates, either in a common canister or in individual, respective canisters. Because of the problem with intermixing of the HCT, LNT and TWC/NOx trap layers the inclusion of a relatively thin barrier layer (e.g., an alumina layer (of about 0.5 g/in$^3$ or less)) that is provided in a position to help block such intermingling is desirable in some embodiments. For example, a barrier layer positioned between a TWC layer and a HCT layer is helpful in avoiding undesirable intermixing. As thin barrier layers are not always fully effective in preventing intermixing, it can also be helpful to utilize zones as in an HCT zone used with a NOx/TWC trap in the same layer, but having a small spacing gap of, for example, 2-3 mm between them). There is provided below a more detailed discussion of some techniques that help avoid an undesirable intermixing of, for example, material in the HCT and TWC that may not be adequately compatible. Accordingly, while the layers depicted in FIGS. 5 to 13 are shown as being in direct contact, embodiments of the invention are inclusive of additional intermediate layers either above, or below, or both above and below, in addition to those specifically depicted (although embodiments also include direct layer contact relative to the HCT, LNT and TWC layers). For example, in the FIG. 5 embodiment an added intermediate layer can be provided between the LNT and HCT stacked arrangement shown. Some of the potential intermediate (e.g., barrier) layer arrangements and techniques are described in some of the FIGS described below (e.g., FIG. 11A). Also, while reference is made to barrier layers as the depicted intermediate layer; other embodiments include having intermediate layers having different functioning purposes and associated material (e.g., additional catalyst layers, etc.) For example, an intermediate layer can be an oxygen storage catalyst material (or OSC) rich OSC-alumina washcoat component as a barrier layer or just alumina.

For purposes of the present application, the terminology "close-coupled (cc) position" is one that is close to the engine outlet, as in the initial contact of the close-coupled catalyst system device being at or within and up to 30 cm from engine outlet (based on exhaust pipe length), and more preferably in some situations being at or within 20 cm from the engine outlet to the components inlet. Many embodiments of the present invention include CC converters within about 15 cm (within 6 inches).

Also, the reference to "underbody" (UB) position in the present case is in reference to a farther downstream location (beyond the 30 cm close-coupled range value) as to provide, for example, a location away from the engine and under the cabin floor of the vehicle with the engine emitting exhaust. The under body spacing should be sufficient to ensure the maximum exhaust temperatures do not surpass the degradation temperature of underbody TRAP component. For example, the temperature the trap will experience at a given distance varies with vehicle type. In preferred embodiments the underbody TRAP component should not regularly see temperatures above 750° C. and the max continuous operation is 800° C. with some spikes to <850° C. Higher heat temperature embodiments for the underbody TRAP components are, however, featured under the present invention. Also, examples of suitable spacing of CC positioned ETA components and downstream underbody TRAP components include, for example, a distance range of 50 to 100 cm (CC outlet-to-UB TRAP inlet). However, distances from the engine and between CC component and UB TRAP components are primarily dictated by the temperature along the exhaust passageway. A CC range of 0-30 cm (to inlet of CC component from exhaust manifold outlet) and 90-150 cm (from the exhaust manifold outlet to the inlet of the TRAP) represent suitable distances under many embodiments of the invention.

For purposes of the present invention a CC temperature range of 600 to 1,000° C. and 350 to 700° C. for the underfloor components of the present invention is preferred.

In FIG. 5, the HC-NOx trap combination 46 (or TRAP) of the ETA features a NOx trap component 48 (labeled as a lean nitrogen trap or LNT). NOx trap component 48 is schematically shown as being an overlying washcoat layer extending over the HC-trap (HCT) component 50. HC-trap component 50 is shown as being a washcoat layer applied to an underlying support substrate 52 (or "substrate" for short). In the illustrated FIG. 5 configuration, the HC and NOx traps are shown located on a single brick or monolithic substrate 52 (potential embodiments of which include flow-through substrates as well as the other embodiments described above and below). Preferably the NOx trap overcoat featured in embodiments of the invention acts both as a trap for NOx and also as a TWC catalyst for the conversion of both released HCs and NOx as well as CO oxidation. This is the case, as preferred embodiments of NOx traps under the present invention have full TWC performance capability as well as acting as NOx traps at lower temperatures when the exhaust is calibrated lean with excess oxygen present.

As further seen in FIG. 5, each of the layers 48 and 50 are shown as being of equal longitudinal length, with the illustrated uppermost layer 48 fully covering the underlying layer 50. Further in the embodiment shown in FIG. 5 each of layers 48 and 50 is commensurate in length with the underlying substrate 52 such that substrate 52 is fully coated over 100% of its total length Ls (with the reference "Ls" here and below also depicting a length of coverage over 100% of the "portion" of substrate 52 that is not covered with some other material (if even present) other than one of the LNT, NOx and TWC materials described in FIGS. 5 to 13). For instance, because of possible negative interactions (such as those described above) it can be advantageous that one TRAP component length is shortened so as to limit intermixing. Thus the HCT layer might not be the full length of the brick so as to limit the extent intermixing of the layers. Also it might be preferable to have the TWC/NOx trap at the outlet of the brick to maximize conversion as the HCs desorb from the trap outlet. For example, with a shorter zone you have potential for a higher concentration of the PGMs for the same total PGM in the full length of the brick). Variations are also featured under the present invention. Aspects of the invention thus include a partial overlap situation wherein, for example, the LNT is shorter in length than the HCT as to leave an exposed portion (at either end). An additional embodiment of the invention includes a high concentration PGM band (preferably a Pd band) of a less than half length such as a 2-3 cm long. The PGM layering at the outlet of the trap can be applied by using a PGM (e.g., Pd) solution dip. In this way there is added PGM (e.g., Pd) at a strategic location without adding extra washcoat or WC (increased thermal inertia) and via this arrangement there is the potential to oxidize the HCs before they permanently leave the HCT or TRAP in general).

Figure 6:
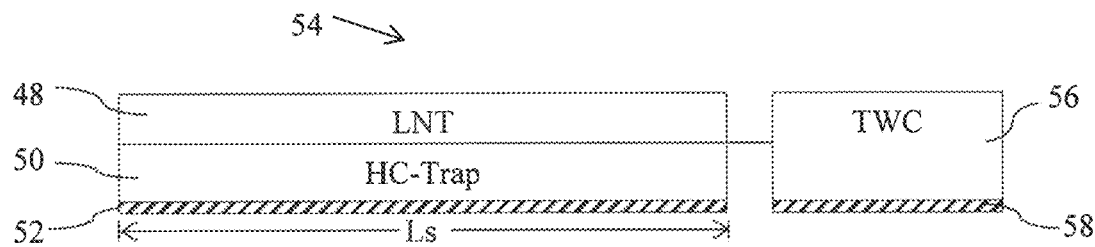
FIG. 6 shows a layered LNT/HCT having a catalyst configuration like that in FIG. 5, plus a downstream positioned TWC, and the combination of the LNT/HCT and TWC representing a TRAP embodiment of the present invention, which TRAP is well suited for use with an air/fuel calibration control unit of the present invention.

In FIG. 6, the same catalyst system configuration used in FIG. 5 is supplemented with an added (downstream in this case) TWC catalyst that is effective for NOx and HC conversion. For instance, a preferred embodiment features a TWC with an Rh only PGM loading or a Pd/Rh loading, with suitable Rh loading quantities to this depicted TWC TRAP component include 1 to 75 g/ft$^3$ (more preferably 5-50 g/ft$^3$ and still more preferably 10-30 g/ft$^3$) or Pd in the amount of 10 to 300 g/ft³ and Rh in the amount of 2 to 30 g/ft³ when used in combination. These ranges are also applicable in other embodiments wherein the TWC layer is an overcoat of one or more underlying layers inclusive of an HCT layer.

Thus, in FIG. 6, the HC-NOx trap combination 54 of the ETA features the FIG. 5 upstream layered combination of LNT overcoat 48 positioned over underlying HCT layer 50 on a common substrate 52, which is followed downstream by TWC 56. TWC 56 is further shown as being supported by an independent substrate 58. TWC 56 can be any conventional TWC although a preference relative to the present usage and arrangement in the HC-NOx trap combination 54 includes one where PGM material of Rh-only is utilized or a combination of Rh/Pd material is utilized. An example of a suitable washcoat method of application for providing a desirable TWC coating includes one like that described above for the TWC coating applied to the CAT-HCT.

Preferably each of the components shown in FIG. 6 is arranged in an underbody location. Also, in FIG. 6 the downstream TWC's inlet is preferably within 0 to 20 cm (with zero representing an abutment relationship as in two bricks (e.g., in a common converter canister) of the downstream end of the upstream positioned HCT (this dimension range is preferably also applicable to any of the schematic interconnecting horizontal line designations shown between components of the TRAP in FIGS. 5 to 13). These downstream distances of the TRAP are inclusive of common canister different brick spacing, although, embodiments also include separate canisters spaced within the above noted spacing range, as in an upper half sub-range. The spacing discussion for this FIG. 6 embodiment can also be applicable to other arrangements having the noted line spacing in the embodiments above and below. One relative position configuration in the FIG. 6 general arrangement features two bricks (one having the LNT/HCT layer combination, and the other the downstream TWC) positioned in one converter so as to be very close to each other, as in the bricks being separated by 1 cm +/−0.5 cm. Alternative arrangements include two converters which often have a greater spacing as in 5-20 cm apart.

Figure 7:
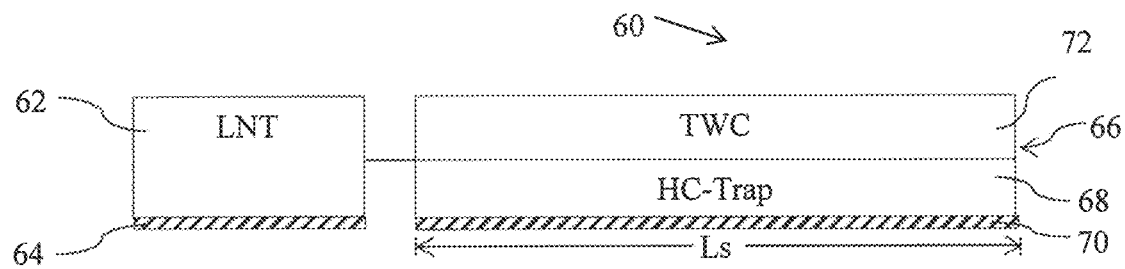
FIG. 7 shows an alternate example of a catalyst system under the scope of the present invention, with the catalyst sequence including a dedicated NOx catalyst (LNT) followed downstream by a layered TWC/HCT, which all three together form the TRAP, and which TRAP is well suited for use with an air/fuel calibration control unit of the present invention.

FIG. 7 shows HC-NOx trap combination (or TRAP) 60 of the ETA as including lean NOx trap (or LNT) 62 and associated substrate 64 (e.g., an independent LNT coated brick) as being located in front of (upstream) of catalyzed HC-trap 66. That is, an HCT overcoat with a TWC layer as to represent a "catalyzed HC-trap". Again, the above described spacing for the FIG. 6 embodiment (both canister and brick-spacing for the downstream TWC) applies equally as well, but from an upstream LNT-to-downstream HCT/TWC combination perspective. Catalyzed HC-trap 66 is shown in the FIG. 7 embodiment as having HCT layer 68 as an under-layer supported by substrate 70. FIG. 7 further shows HCT layer 68 being coated with an over-layer TWC 72. TWC 72 can be any conventional TWC although a preference relative to the present usage and arrangement in the HC-NOx trap combination 60 includes one where PGM material of Rh-only is utilized in the TWC, or a combination of Pd/Rh material is utilized in the TWC. Preferably each of the components shown in FIG. 7 is arranged in an underbody location. A suitable Rh or Pd/Rh loading is inclusive of the amounts described above for FIG. 6 (with the above described CAT-HCT's TWC catalyst coating layer with Pd and Rh composition (and associated method of manufacturing) being one example of a suitable TWC layer).

Figure 8:
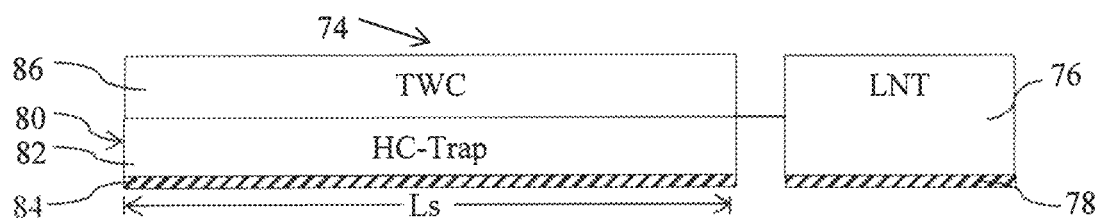
FIG. 8 shows an alternate example of a catalyst system under the scope of the present invention, with the system being a reversed order version of that in FIG. 7, as to feature a catalyst sequence that includes a TWC/HCT followed downstream with a dedicated LNT catalyst, which all three together form the TRAP, and which TRAP is well suited for use with an air/fuel calibration control unit of the present invention.

FIG. 8 shows HC-NOx trap combination 74 as including lean NOx trap (or LNT) 76 and associated substrate 78 located behind (downstream with spacing of bricks and/or canisters such as that described above) of catalyzed HC-trap 80. Catalyzed HC-trap 80 is shown in this embodiment as having HCT layer 82 as an under-layer supported by substrate 84. FIG. 8 further shows HCT layer 82 being coated with an over-layer TWC 86. TWC 86 can be any conventional TWC although a preference relative to the present usage and arrangement in the HC-NOx trap combination 74 includes one where PGM material of Rh-only is utilized in the TWC, or a combination of Pd/Rh material is utilized in the TWC (as in the above described Example CAT-HCT's TWC recipe which can represent one suitable TWC composition and method of manufacturing example). Preferably each of the components shown in FIG. 8 is arranged in an underbody location. Also, the composition percentages for the PGM loading described for the TWC in FIG. 6 are applicable here as well for some embodiments of the invention.

Figure 9:
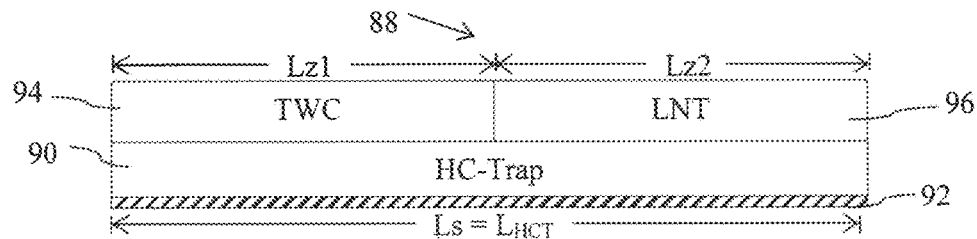
FIG. 9 shows an alternate example of a catalyst system under the scope of the present invention, with the system being both layered and zoned with an underlying HCT layer covered by a zoned arrangement featuring a TWC zone followed with a downstream LNT zone, which all three together form the TRAP, and which TRAP is well suited for use with an air/fuel calibration control unit of the present invention.

FIG. 9 shows HC-NOx trap combination 88 of the ETA with HCT layer 90 as an under-layer that is received by common (single "brick" substrate 92). FIG. 9 further shows HCT layer 90 being coated with a zoned over-coating that includes upstream TWC zone 94 and downstream LNT zone 96. In FIG. 9 each of the zones 94 and 96 are shown in sum to cover the full length Ls of substrate 92 (i.e., Lz1+Lz2=Ls=Lhct). Zone length variations are also contemplated under the present invention inclusive of reductions in zone 94 with or without a corresponding increase in zone 96 (with or without gap formation). For example, a reduction/increase in the illustrated 50%/50% length arrangement for zones 94 and 96 to one where zone 94 is reduced to less than 50% and greater or equal to 10%, and zone 96 is increased to greater than 50% and less than or equal to 90%. Alternatively, a reduction/increase in the illustrated 50%/50% length arrangement for zones 94 and 96 to one where zone 96 is reduced to less than 50% and greater or equal to 10% and zone 94 is increased to greater than 50% and less than or equal to 90%. In addition, variations contemplated under the scope of the present invention include overlapping arrangements as where zone 94 overlaps a percentage of zone 96 as in 25% or less of the length of zone 96 being overlapped or 100% down to 25% being overlapped. Alternatively, zone 96 can extend in an overlapping arrangement over zone 94 as in 25% or less of the length of zone 94 or 100% to 25% being overlapped. Alternatively, there can be an intermingled zone region such as feathered edge arrangement wherein the thickness of one zone decreases in a common intermediate area and a thickness of the other increases, or vice versa, with the overall thickness being the same both in the feathered sections and non-feathered sections (overlapping triangular extension in each zone interface). Still further, there can be provided a gap in between the respective zones, with the gap preferably not exceeding a gap length of more than 25% of the Lst. Additional overlap and exposure relationships are further described below.

Also, TWC 94 can be any conventional TWC (e.g., the CAT-HCT's TWC layer material described above). A preference relative to the present usage and arrangement in the HC-NOx trap combination 88 includes a PGM loaded TWC 94 where PGM material of Rh-only is utilized in the TWC, or a combination of Pd/Rh material is utilized in the TWC. Also, in the illustrated embodiment each of the zones 94 and 96 cover fully their respective percentage of extension over substrate 92, although alternate embodiments feature having one or both zones 94 and 96 not fully covering the underlying (internally PGM catalyzed) HCT layer (preferably not more than 40% total of exposure in the HCT layer based on the non-coverage of the one or both zoned layers when not fully covering the HCT layer). Also, embodiments include having the HCT layer not fully extending the full length of the substrate such that one or both of the zone layers extend into a more direct support relationship relative to the substrate (e.g., direct contact of one or both zone materials to the substrate rather than the HCT layer). Preferably each of the components shown in FIG. 9 is arranged in an underbody location.

To help in visualization of some of the potential gap spacing, overlap, and added intermediate (e.g., barrier) layering, some of which is already described above, reference is made to FIGS. 9A to 9G which generically designate by the way of lettering, different TRAP Material locations. For example, applying the generic lettering presentation in FIG. 9A to the FIG. 9 configuration there can be seen the following: AZ=TWC/BZ=a zone gap or interface arrangement (shown abutting in FIG. 9)/CZ=LNT/DZ=an upstream intermediate (barrier) zone (or zone portion) not shown in FIG. 9 embodiment/EZ=a downstream barrier zone (or zone section) not shown in FIG. 9 embodiment/FZ=HC-Trap/ GZ=support substrate Under this framework, it can be seen in FIG. 9B that the zone gap or interface arrangement BZ1 features downstream CZ (LNT in FIG. 9) extending upstream to overlap upstream layer AZ (TWC in FIG. 9). Again the relative overlap distance, etc. is described above in the general discussion for FIG. 9 (as in, for example, not exceeding 25% overlap or extending from 25% to a full 100% overlap).

Figure 9A:
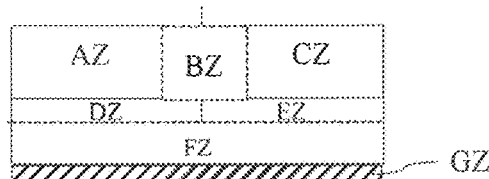
FIG. 9A shows FIG. 9 with added generic reference depictions to facilitate showing different coating variations when there is an upstream zone and downstream zone of different materials covering over a continuous under-layer of a common material supported by a substrate (e.g., monolithic substrate) and with or without an intermediate continuous or zoned barrier layer.
Figure 9B:
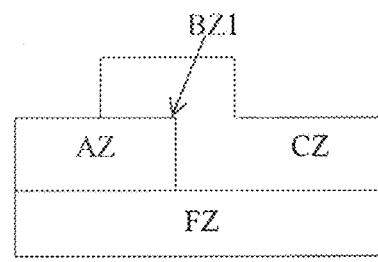
FIG. 9B shows a schematic depiction of the interface region for the noted upstream and downstream different material zones in FIG. 9A, wherein the downstream layer extends over in an overlapping manner the upstream zone.
Figure 9C:
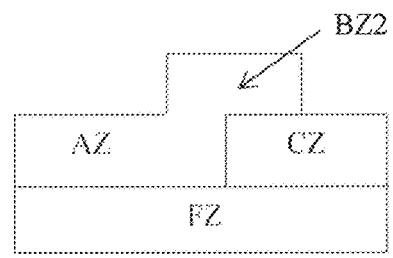
FIG. 9C shows a schematic depiction of the interface region for the noted upstream and downstream different material zones in FIG. 9A, wherein the upstream layer extends over in an overlapping manner the downstream zone.

FIG. 9C shows a reverse overlapping relationship for upstream/downstream zones AZ/CZ wherein, in the interface area BZ2, upstream layer AZ (TWC in FIG. 9) overlaps downstream zone layer CZ (LNT in FIG. 9). Again the relative length of the overlap etc. potential embodiments can be found above as in the FIGS. 9 and 9C general discussion.

Figure 9D:
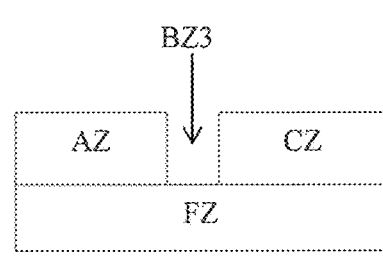
FIG. 9D shows a schematic depiction of the interface region for the noted upstream and downstream different material zones in FIG. 9A wherein the upstream zone and downstream zone are separated by a gap as in an air gap.

FIG. 9D shows an air gap arrangement at BZ3 featuring AZ (TWC in FIG. 9) actually air gap separated from CZ (LNT in FIG. 9). This provides added surety relative to avoiding any undesirable intermixing when one material in one zone may not be fully compatible with a material in another zone.

Figure 9E:
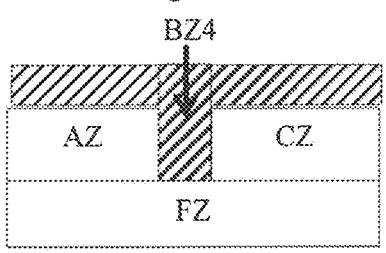
FIG. 9E shows a schematic depiction of the interface region for the noted upstream and downstream different material zones in FIG. 9A wherein the upstream zone and downstream zone are separated by a gap filled in by another intermediate (e.g., "barrier") material.

FIG. 9E shows an alternate BZ4 arrangement for the gap/interface region (represented by BZ in FIG. 9A) wherein, rather than an air gap, an overcoating layer that extends between upstream/downstream layers AZ/CZ is provided. A barrier can comprise a gas porous material as in a high surface area gamma alumina or other material suitable to preclude or limit zone material migration and intermixing, but provides for any gaseous interfacing involvement in the catalyst and/or trapping function of the pertinent TRAP component.

It can be seen that while labeled "FIG. 9A" the generic lettering is applicable to other arrangements under the present invention for the TRAP material. For instance, relative to the below described FIG. 10, it can be seen that the FIG. 9A AZ and CZ zone layers can be representative of the upstream FIG. 10 LNT=AZ zone and downstream FIG. 10 TWC=CZ zone, together with any of the various gap/ interface BZ arrangements shown in FIG. 9A to 9E being also applicable under different aspects of the present invention.

Figure 9F:
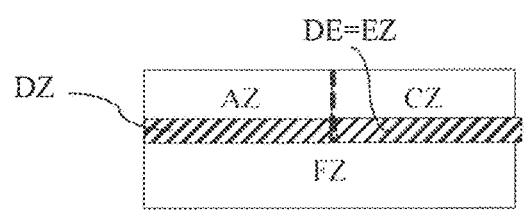
FIG. 9F shows a schematic depiction of an intermediate layer as in a barrier layer that extends below both an overlying upstream zone and an overlying downstream zone as shown in FIG. 9A, as in one extending the full length of an underlying support substrate.
Figure 9G:
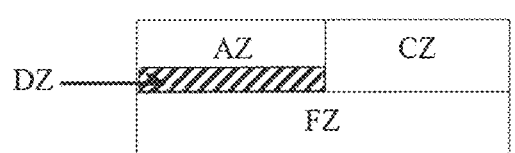
FIG. 9G shows a schematic depiction of an intermediate layer as in a barrier layer that underlies only an upstream one of two overlying zones shown in FIG. 9A, as in one extending the full length of the overlying upstream zone to provide an intermediate barrier layer in the catalyst thickness direction (e.g., radial direction).
Figure 9H:
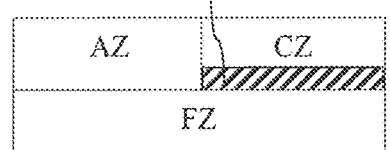
FIG. 9H shows a schematic depiction of an intermediate layer as in a barrier layer that underlies only a downstream one of two overlying zones shown in FIG. 9A as in one extending the full length of the overlying downstream zone to provide an intermediate barrier layer in the catalyst thickness direction.

With reference to FIGS. 9F to 9H, there is provided a few intermediate (e.g., barrier) layer examples (e.g., means for limiting TRAP material intermixing). Thus, when the intermediate layer is used as a barrier, it is designed to sufficiently limit the level of undesired intermixing (as in situations described above wherein one TRAP competent material can degrade (e.g., poison) another TRAP component material). While a variety of barrier layer lengths and thicknesses are featured, an alumina in a thickness range of (for longitudinal zone use) 5.0 to 20 mm, and (for washcoat thickness zone use) 5 to 50 microns is well suited and sufficiently porous such that (at those thicknesses) the desired gaseous components pathway(s) involved in the emission cleaning are not disrupted by the barrier (while the barrier is sufficiently thick to provide at least some degree of TRAP zone material intermixing prevention).

In FIG. 9F there can be seen by the dashed line and inclusion only of DZ on the left side and DZ=EZ on the right side to connote that only a single layer barrier extends the full length between the overlying zone layer and the underlying (unitary) layer FZ, or at least to some extent across the interfaced region (BZ)—with (BZ) not shown in FIGS. 9F to 9G as to better allow for visualization of the radius thickness barrier layer sandwich arrangement.

FIG. 9G shows intermediate (barrier) layer DZ (only) to show a focus on avoiding migration and/or intermixing between just an upstream zone AZ (e.g., TWC in FIG. 9; LNT in FIG. 10) and the underling HCT zone.

FIG. 9H shows intermediate barriers layer (EZ only) focusing on avoiding migration and/or intermixing between downstream zone CZ TRAP material (LNT in FIG. 9; TWC in FIG. 10) and the underlayer HCT zone. Again a variety of BZ gap/interface arrangements are featured under the present invention such as those described above. Also, although barrier layers such as DZ are shown extending in a common length as the zone above in FIGS. 9G and 9H, embodiments of the invention also include extending barrier layers such as DZ in a gap region coming up (radially out) between zones AC and CZ, for example. Again the generic representations in FIG. 9A apply as well with corresponding position TRAP members such as FIG. 9H showing CZ=TWC per the FIG. 10 arrangement.

Figure 10:
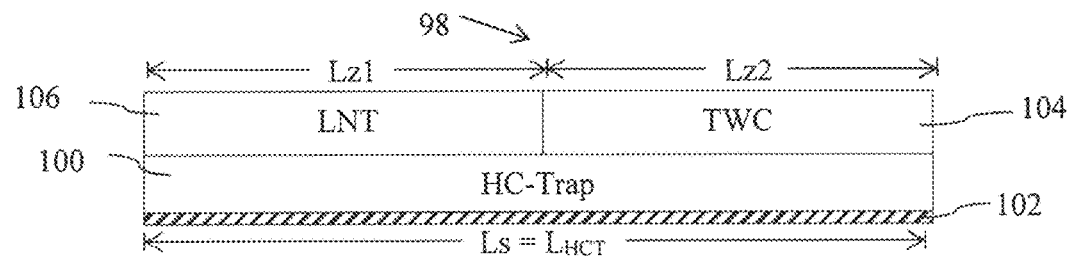
FIG. 10 shows an alternate example of a catalyst system under the scope of the present invention, with the system being both layered and zoned and featuring an underlying HCT layer which is covered by a zoned arrangement featuring an LNT zone followed downstream with a TWC zone, which all three together form the TRAP, and which TRAP is well suited for use with an air/fuel calibration control unit of the present invention.

FIG. 10 shows HC-NOx trap combination 98 of the ETA featuring HCT layer 100, as an under-layer that is received by substrate 102. FIG. 10 further shows HCT layer 100 being coated with a zoned over-coating that includes downstream TWC zone 104 and upstream LNT zone 106. In FIG. 10 each of the zones 104 and 106 are shown in sum to cover the full length Ls of substrate 102 (i.e., Lz1+Lz2=Ls=Lhct). Zone length variations are also contemplated under the present invention inclusive of reductions in zone 104 with or without a corresponding increase in zone 106, and vice versa. For example, a reduction/increase in the illustrated 50%/50% length arrangement for zones 104 and 106 to one where zone 104 is reduced to less than 50% and greater or equal to 10% and zone 106 is increased to greater than 50% and less than or equal to 90%. Alternatively, a reduction/ increase in the illustrated 50%/50% length arrangement for zones 104 and 106 to one where zone 106 is reduced to less than 50% and greater or equal to 10% and zone 104 is increased to greater than 50% and less than or equal to 90%.

In addition, variations contemplated under the scope of the present invention include overlapping arrangements as where zone 104 overlaps a percentage of zone 106 as in 25% or less of the length of zone 106 being overlapped or 100% down to 25% being overlapped. Alternatively, zone 106 can extend in an overlapping arrangement over zone 104 as in 25% or less of the length of zone 104 or 100% down to 25% being overlapped. Alternatively, there can be an intermingled region such as a feathered edge arrangement wherein the thickness of one zone decreases in a common intermediate area and a thickness of the other increases, or vice versa, with the overall thickness preferably being the same both in the feathered sections and non-feathered sections (overlapping triangular extensions in each zone interface).

Still further, there can be provided a gap in between the respective zones, with the gap preferably not exceeding a gap length of more than 25% of the Lst. Also, TWC 104 can be any conventional TWC, although a preference relative to the present usage and arrangement in the HC-NOx trap combination 98 includes one where PGM material of Rh-only is utilized as a metal based catalyst, or a combination of Pd/Rh material is utilized as the metal based catalyst in the TWC. Reference is made as well to the above described washcoat application to provide a TWC layer with Pd and Rh as PGM, which represents a possible composition and method of production for the TWC 104.

Also, in the illustrated embodiment each of the zones 104 and 106 cover fully their respective percentage of extension over substrate 102, although alternate embodiments feature having one or both zones 104 and 106 not fully covering the underlying HCT layer (preferably not more than 40% total of exposure in the HCT layer based on the non-coverage of the one or both zoned layers when not fully covering the underlying HCT layer). Also, embodiments include having the HCT layer not fully extending the full length of the substrate such that one or both of the zone layers extend into a more direct support relationship relative to the substrate 102 (e.g., direct contact of one or both zone materials to the substrate rather than the HCT layer). Preferably each of the components shown in FIG. 10 is arranged in an underbody location.

Figure 11:
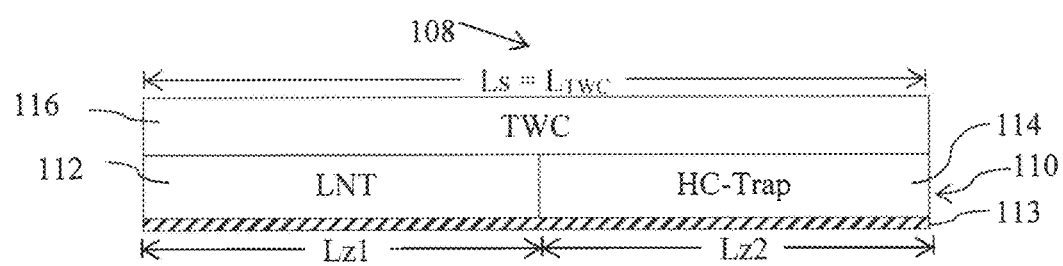
FIG. 11 shows an alternate example of a catalyst system under the scope of the present invention, with the system being both layered and zoned and featuring a zoned underlayer arrangement featuring an LNT zone followed by a downstream HCT zone, with each in the zoned combination being covered by a TWC layer, which combination forms the TRAP, and which TRAP is well suited for use with an air/fuel calibration control unit of the present invention.

FIG. 11 shows HC-NOx trap combination 108 features under-layer 110 that is a zoned layer that has upstream LNT zone 112 and downstream HCT zone 114, with the zoned combination under-layer 110 being supported on substrate 113. FIG. 11 further shows zoned under-layer 110 being coated with an over-coating of TWC 116 extending fully over each of zones 112 and 114. Thus, zones 112 and 114, in sum, cover the full length Ls of substrate 113 (i.e., Lz1+Lz2=Ls=Ltwc). Zone length variations are also contemplated under the present invention inclusive of reductions in zone 112 with or without a corresponding increase in zone 114. For example, a reduction/increase in the illustrated 50%/50% length arrangement for zones 112 and 114 to one where zone 112 is reduced to less than 50% and greater or equal to 10% and zone 114 is increased to greater than 50% and less than or equal to 90%. Alternatively, a reduction/increase in the illustrated 50%/50% length arrangement for zones 112 and 114 to one where zone 114 is reduced to less than 50% and greater or equal to 10% and zone 112 is increased to greater than 50% and less than or equal to 90%. In addition, variations contemplated under the scope of the present invention include overlapping arrangements as where zone 112 overlaps a percentage of zone 114, as in 25% or less of the length of zone 114 being overlapped or 100% down to 25% being overlapped. Alternatively, zone 114 can extend in an overlapping arrangement over zone 112 as in 25% or less of the length of zone 112 or 100% down to 25% being overlapped. Alternatively, there can be an intermingled zone region such as a feathered edge arrangement wherein the thickness of one zone decreases in a common intermediate area and a thickness of the other increases, or vice versa, with the overall thickness preferably being the same both in the feathered sections and non-feathered sections (overlapping triangular extensions in each zone interface).

Still further, there can be provided a gap in between the respective zones, with the gap preferably not exceeding a gap length of more than 25% of the Lst. Also, TWC layer is shown extending fully over each of the zoned layers, although in alternate embodiments it may be shortened at one end or both ends relative to the underlying zone(s) such that a portion of zones 112 and 114 are more directly exposed to the exhaust gas flow. The amount of exposure is preferably less than 40% of the overall length of the substrate for the two zones 112 and 114. Further, TWC 116 can be any conventional TWC, although a preference relative to the present usage and arrangement in the HC-NOx trap combination 108 includes one where PGM material of Rh-only is utilized in the TWC, or a combination of Pd/Rh material is utilized for the metal based catalyst material of the TWC. The aforementioned TWC layer for the CAT-HCT is one example of a composition and potential washcoat preparation method for the TWC 116 in this embodiment. Preferably each of the components shown in FIG. 11 are arranged in an underbody location.

Figure 11A:
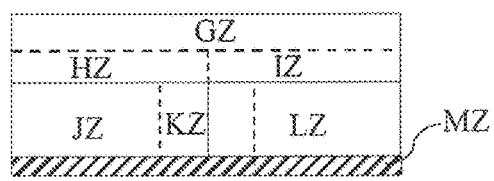
FIG. 11A shows FIG. 11 with added reference depictions to facilitate showing different coating variations when there is an upstream zone and downstream zone of different materials underlying a continuous over-layer of a common material with the combination supported by a substrate and there being or not being an intermediate continuous or zoned barrier layer.

In similar fashion to FIG. 9A, FIG. 11A provides a generic illustration of various gap or interface arrangements for different TRAP material regions, as well as potential intermediate (e.g., barrier) layer arrangements. A difference between the depictions in FIGS. 9A and 11A is found in the fact that in FIG. 9A it was the upper layer (e.g., AZ and CZ) that was zoned and the underlayer FZ bridged across both of the upper upstream/downstream zones (preferably fully extending the same length from the upstream end of the upstream zone AZ to the downstream end of downstream zone CZ, although other than full length extension arrangements are also featured under the present invention). Accordingly, in FIG. 11A the bridging layer GZ (is shown extending the full length of underlining zones JZ and LZ although variations in bridging length extension are also contemplated).

Further, rather than the gap interface region BZ being present in the overlayer region, in FIG. 11A an under layer equivalent gap/interface zone KZ is featured. Again the generic lettering in FIG. 11A can apply to other embodiment arrangements as in the FIGS. 12 and 13 arrangements. For example, JZ in FIG. 11A is representative of, for example, LNT in FIG. 11; HCT in FIGS. 12 and 13.

Figure 11B:
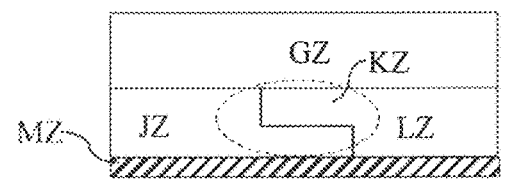
FIG. 11B shows a schematic depiction of the interface region for the noted upstream and downstream different material zones in FIG. 11A, wherein the downstream layer extends over in an overlapping manner the upstream zone.

FIG. 11B shows a similar overlap arrangement as in FIG. 9B but with the overlap being in the zone KZ under the over covering zone GZ. Again, while the degree of overlap is shown relatively small in FIG. 11B other distances of overlap such as those described above are featured under the present invention (as in the overlap length discussions described above). Thus, using FIG. 11B as the frame of reference and the below described FIG. 12 material, zone LZ of LNT extends upstream from its downstream position to coat over at least the downstream end of the upstream JZ layer of HCT.

Figure 11C:
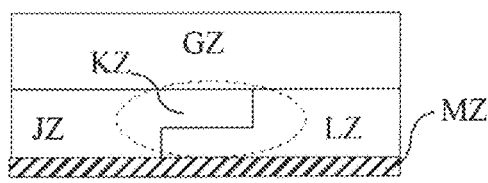
FIG. 11C shows a schematic depiction of the interface region for the noted upstream and downstream different material zones in FIG. 11A, wherein the upstream layer extends over in an overlapping manner the downstream zone.

FIG. 11C shows an opposite overlap arrangement of the covered over (covered with the GZ layer upstream) downstream zones JZ and LZ, with JZ extending over the upstream end of the downstream zone LZ.

Figure 11D:
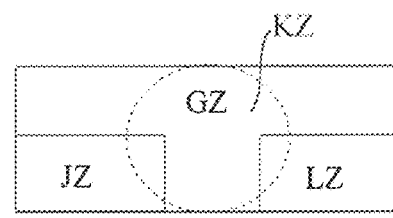
FIG. 11D shows a schematic depiction of the interface region for the noted upstream and downstream different material zones in FIG. 11A wherein the upstream zone and downstream zone are separated by an intermediate (e.g., "barrier") gap filler (provided by an extended, bridging over-coat in the illustrated embodiment, or left uncovered (wherein the overlying layer has a corresponding air gap as well).

FIG. 11D shows an alternate configuration featuring gap/interface zone KZ represented by overcoat layer GZ extending down to present an intermediary between the upstream and downstream zones JZ and LZ. However, in view of the desire for many embodiments to avoid relative material contact between, for example, HCT and TWC zones, this is a less desirable configuration in the many instances unless GZ represents a barrier layer with a further overcoat layer (e.g., a TWC overcoat layer (not shown in FIG. 11D) present over GZ as a barrier layer).

Figure 11E:
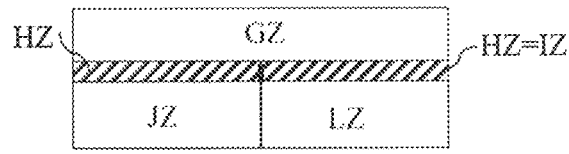
FIG. 11E shows a schematic depiction of an intermediate (e.g., barrier) layer that bridges the underlying upstream and downstream (different material) zone set shown in FIG. 11A, as in one extending the full length of an underlying support substrate.
Figure 12:
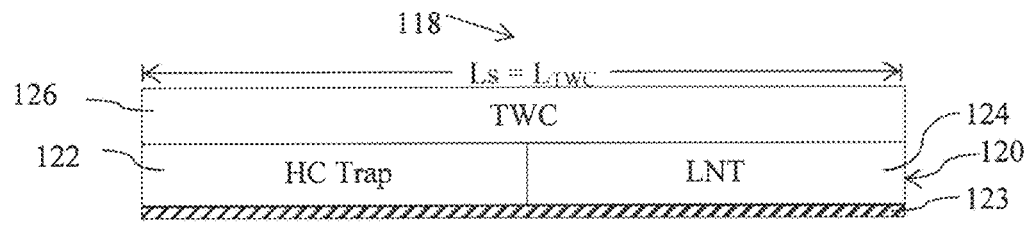
FIG. 12 shows an alternate example of a catalyst system under the scope of the present invention, with the system being both layered and zoned and featuring a zoned underlayer arrangement featuring an HCT zone followed by a downstream LNT zone, with each in the zoned combination being covered by a TWC layer, which combination forms the TRAP, and which TRAP is well suited for use with an air/fuel calibration control unit of the present invention.

FIG. 11E shows as an additional embodiment featuring an intermediate (from the standpoint of layer coating sequence) layer HZ falling between an overcoat layer GZ (e.g., TWC of FIG. 12) and an underlying upstream zone JZ (e.g., FIG. 12—HCT upstream zone) as well as downstream zone LZ (e.g., FIG. 12 LNT downstream zone). In FIG. 11E, embodiment barrier zone HZ extends over both of the upstream and downstream zones JZ and LZ (e.g., a full length covering each JZ and LZ and hence the indication HZ=JZ on the downstream side).

Figure 11F:
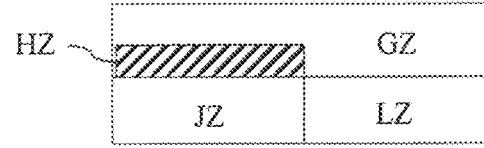
FIG. 11F shows a schematic depiction of a barrier layer that extends along only an upstream one of two underlying zones shown in FIG. 11A, as in one extending the full length of the underlying upstream zone to provide an intermediate (e.g., barrier) layer in the catalyst thickness direction.

FIG. 11F shows an arrangement with intermediate (e.g., barrier) HZ layer covering (e.g., fully covering) underlayer JZ, but not downstream layer LZ (resulting in GZ covering barrier JZ indirectly and LZ partially or fully directly covered by the GZ downstream layer portion). Thus, with reference to the FIG. 12 arrangement as an example, GZ=TWC/HZ=intermediate layer such as a barrier layer of high surface area alumina (not shown in FIG. 12), JZ=HCT; and LZ=LNT).

Figure 11G:
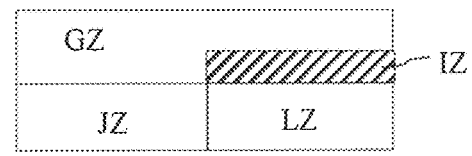
FIG. 11G shows a schematic depiction of a barrier layer that extends along only a downstream one of two underlying zones shown in FIG. 11A as in one extending the full length of the underlying downstream zone to provide an intermediate (e.g., barrier) layer in the catalyst thickness direction.

FIG. 11G shows the intermediate (e.g., barrier) layer IZ as covering over underlayer LZ and GZ covering JZ at least partially and preferably fully. With FIG. 12 as a frame of reference again, the FIG. 11G arrangement would be GZ=TWZ; IZ=an intermediate layer as in high surface area alumina (not shown in FIG. 12) or other high porosity material; JZ=HCT and LZ=LNT.

FIG. 12 shows HC-NOx trap combination 118 features under-layer 120 that is a zoned layer that has upstream HCT zone 122 and downstream LNT zone 124, with the zoned combination under-layer 120 being supported on substrate 123. FIG. 12 further shows zoned under-layer 120 being coated with an over-coating of TWC 126 extending fully over each of zones 122 and 124. Thus, zones 122 and 124, in sum, cover the full length Ls of substrate 123 (i.e., Lz1+Lz2=Ls=Ltwc). Zone length variations are also contemplated under the present invention inclusive of reductions in zone 122 with or without a corresponding increase in zone 124. For example, a reduction/increase in the illustrated 50%/50% length arrangement for zones 122 and 124 to one where zone 122 is reduced to less than 50% and greater or equal to 10% and zone 124 is increased to greater than 50% and less than or equal to 90%. Alternatively, a reduction/increase in the illustrated 50%/50% length arrangement for zones 122 and 124 to one where zone 124 is reduced to less than 50% and greater or equal to 10% and zone 122 is increased to greater than 50% and less than or equal to 90%.

In addition, as described in generic fashion above based on FIG. 11A, variations contemplated under the scope of the present invention include overlapping arrangements as where zone 122 overlaps a percentage of zone 124, as in 25% or less of the length of zone 124 being overlapped or 100% down to 25% being overlapped. Alternatively, zone 124 can extend in an overlapping arrangement over zone 122 as in 25% or less of the length of zone 122 or 100% down to 25% being overlapped. Alternatively, there can be an intermingled zone region such as a feathered edge arrangement wherein the thickness of one zone decreases in a common intermediate area and a thickness of the other increases, or vice versa, with the overall thickness preferably being the same both in the feathered sections and non-feathered sections (overlapping triangular extensions in each zone interface).

Still further, and as generally represented in FIG. 11A, there can be provided a filled in gap in between the respective zones (or a corresponding upper layer gap), with the gap preferably not exceeding a gap length of more than 25% of the Lst. Also, the TWC layer in FIG. 12 is shown extending fully over each of the zoned layers, although in alternate embodiments it may be shortened at one end or both ends relative to the underlying zone(s) such that a portion of zones 122 and 124 are more directly exposed to the exhaust gas flow. The amount of exposure is preferably less than 40% of the overall length of the substrate for the two zones 122 and 124. Further, TWC 126 can be any conventional TWC, although a preference relative to the present usage and arrangement in the HC-NOx trap combination 118 includes one where PGM material of Rh-only is utilized in the TWC or a combination of Pd/Rh material is utilized for the metal based catalyst material of the TWC (e.g., reference is again made to the above described CAT-HCT's TWC washcoat composition and process of forming the washcoat and applying the same, which are applicable here as well). Preferably each of the components shown in FIG. 12 is arranged in an underbody location. Further the HCT (in this embodiment and the additional embodiments described above and below), preferably includes a PGM as in Pd only as per the preferred quantities described above.

Figure 13:
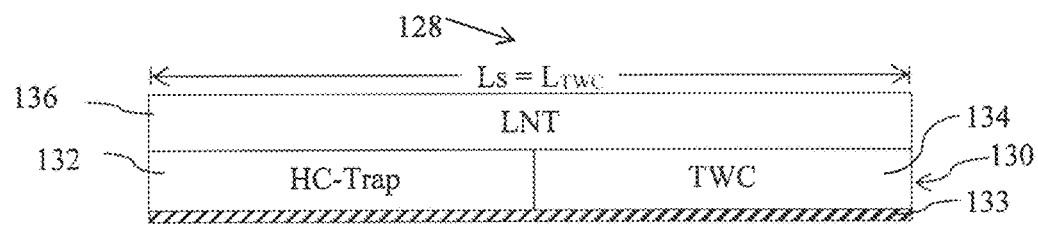
FIG. 13 shows an alternate example of a catalyst system under the scope of the present invention, with the system being both layered and zoned and featuring a zoned underlayer arrangement featuring an HCT zone followed by a downstream TWC zone, with each in the zoned combination being covered by an LNT layer, which combination forms the TRAP, and which TRAP is well suited for use with an air/fuel calibration control unit of the present invention.

FIG. 13 shows HC-NOx trap combination 128 featuring under-layer 130 that is a zoned layer that has upstream HCT zone 132 and downstream TWC zone 134, with the zoned combination under-layer 130 being supported on substrate 133. FIG. 13 further shows zoned under-layer 130 being coated with an over-coating of LNT 136 extending fully over each of zones 132 and 134. Thus, zones 132 and 134, in sum, cover the full length Ls of substrate 133 (i.e., Lz1+Lz2=Ls=Llnt). Zone length variations are also contemplated under the present invention inclusive of reductions in zone 132 with or without a corresponding increase in zone 134. For example, a reduction/increase in the illustrated 50%/50% length arrangement for zones 132 and 134 to one where zone 132 is reduced to less than 50% and greater or equal to 10% and zone 134 is increased to greater than 50% and less than or equal to 90%. Alternatively, a reduction/increase in the illustrated 50%/50% length arrangement for zones 132 and 134 to one where zone 134 is reduced to less than 50% and greater or equal to 10% and zone 132 is increased to greater than 50% and less than or equal to 90%.

In addition, as described in the discussion above for the generic presentation in FIG. 11A, variations contemplated under the scope of the present invention include overlapping arrangements as where zone 132 overlaps a percentage of zone 134, as in 25% or less of the length of zone 134 being overlapped or 100% down to 25% being overlapped. Alternatively, zone 134 can extend in an overlapping arrangement over zone 132 as in 25% or less of the length of zone 132 or 100% down to 25% being overlapped. Alternatively, there can be an intermingled zone region such as a feathered edge arrangement wherein the thickness of one zone decreases in a common intermediate area and a thickness of the other increases, or vice versa, with the overall thickness preferably being the same both in the feathered sections and non-feathered sections (overlapping triangular extensions in each zone interface).

Still further, and as generically represented in FIG. 11A, there can be provided a fill-in gap in between the respective zones (or a corresponding upper layer gap), with the gap preferably not exceeding a gap length of more than 25% of the Lst. Also, LNT layer 136 is shown extending fully over each of the zoned layers 132 and 134, although in alternate embodiments layer 136 may be shortened at one end or both ends relative to the underlying zone(s) such that a portion of zone(s) 132 and 134 is/are more directly exposed to the exhaust gas flow. The amount of exposure is preferably less than 40% of the overall length of the substrate for the two zones 132 and 134. Further, TWC layer 134 can be any conventional TWC, although a preference relative to the present usage and arrangement in the HC-NOx trap combination 128 includes one where PGM material of Rh-only is utilized in the TWC (reference is again made to the TWC composition in the CAT-HCT with Rh as PGM as well as the described manner of formation and application which are applicable here as well), or a combination of Pd/Rh material is utilized for the metal based catalyst material of the TWC. Preferably each of the components shown in FIG. 13 is arranged in an underbody location.

Catalyzed $HCT_{uf}$ embodiments described above feature a layered configuration with an HCT trap and over-coating TWC addition (with the HCT itself preferably including PGM as described above and below). This catalytic layer integration is one technique for providing catalyzation to an HCT, although various comingling and dispersion arrangements are also featured under the present invention. However, having a catalyzing layer above the HCT material is beneficial as it is located directly at the desorption location of the HCT. The catalyzing layer is designed to help promote the breakdown of released HC's previously trapped by the HCT while also preferably being effective relative to the other exhaust pollutants passing across the HCT. Embodiments of the invention further include inclusion in the HCT composition of redox active base metals which under neutral or rich conditions can release oxygen in the same way as Ce does in conventional TWC catalysts and this oxygen can be used for oxidizing HCs to $CO_2$ and water. Suitable elements of this type include transition metals such as Fe, Co, Ni, Cu, Ag; rare earths such as Ce, Pr, Tb and/or P-block elements such as Sn and In. Mixtures of elements as solid solutions can also be added such as Ce—Zr mixed oxides that are doped with Fe, Cu, Ni, Co, Pr, La, Y, Nd, Sn and In. Other preferred additives would be those that promote dimerization or polymerization of alkenes to larger molecules such as Pd, Ni and Cu, with Pd as a PGM addition in the HCT being particularly suited as per the discussion above and the noted loading amounts for PGM's in the HCT as in Pd FIG. 2 less schematically shows an exhaust treatment apparatus ETA under the scope of the present invention featuring an upstream (e.g., a set of two) close coupled TWCs and a downstream (underbody) HC-NOx trap combination such as any one of those described in FIGS. 5 to 13 above.

Figure 2:
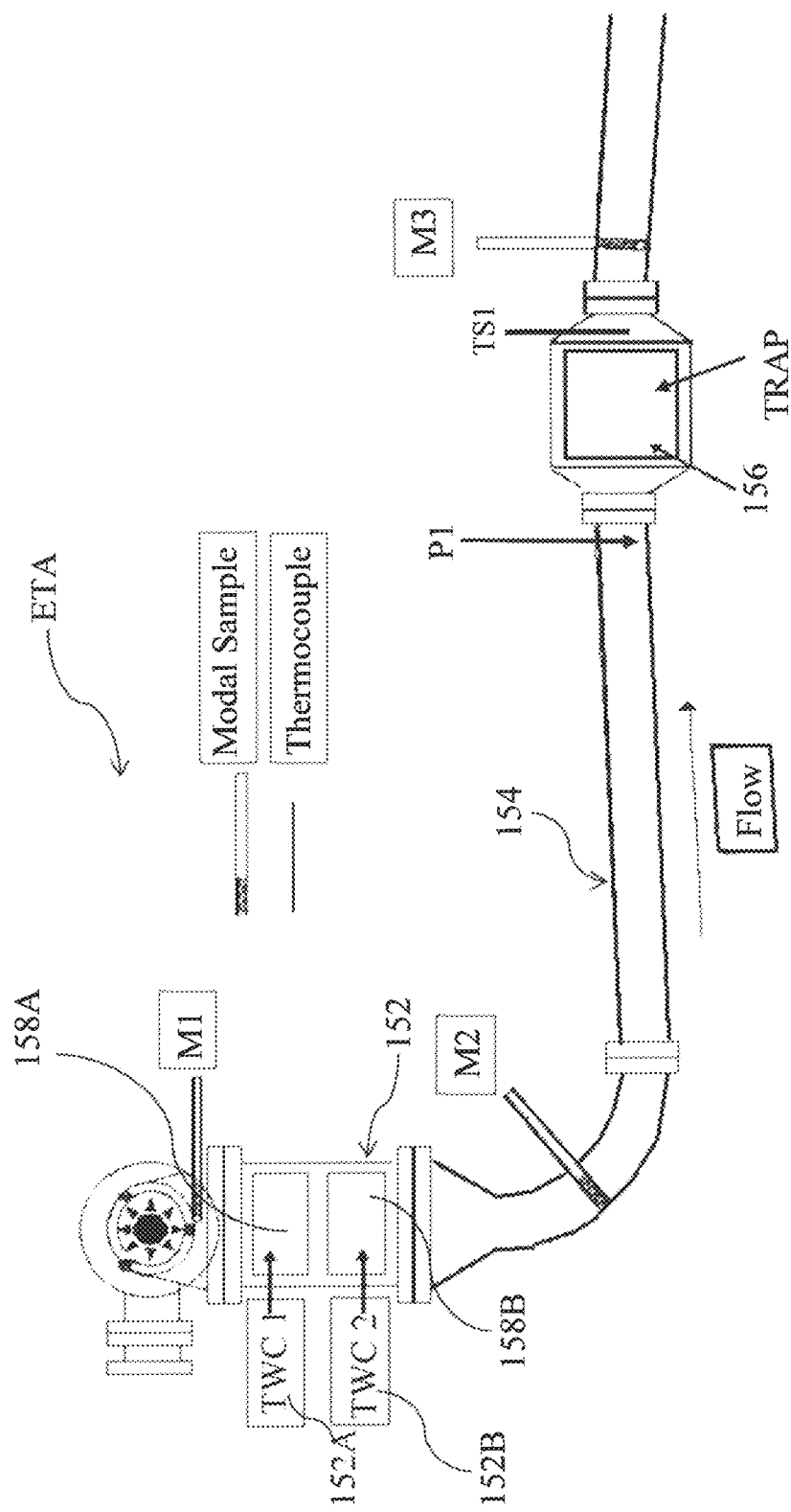
FIG. 2 shows a more detailed (less schematic) view of components with a generic depiction for the TRAP (shown in this embodiment as being in an underbody zone position and downstream of an up-front $TWC_{cc}$ zone) with the generic designation of the TRAP being represented by, but not limited to, any one of the TRAP catalyst systems illustrated in FIGS. 5 through 13 and described herein.

FIG. 2 shows the ETA of the present invention that receives exhaust from Engine E (which can also be any one of the above described engine embodiments including those used in combination as in a hybrid vehicle). In the FIG. 2 embodiment, the ETA is shown inclusive of close coupled catalyst system 152. Close coupled catalyst system 152 includes, for example, one or more TWC catalyst regions (e.g., one TWC, or more than one TWC, each with independent supporting substrates, or multiple different TWC zones (e.g., different loading amounts and/or the catalytic make up) on a common substrate). As noted above TWC system 152 is positioned in a close coupled region relative to the exhaust line 154 of the ETA.

FIG. 2 further shows catalyzed HCT-NOx trap combination 156 (e.g., one of the above described TRAP combination arrangements in FIGS. 5 to 13) positioned downstream (e.g., an underbody position that places the inlet of the $HCT_{uf}$ downstream from the outlet of the most downstream $TWC_{cc}$ (see the above described CC and UB illustrative relative temperature zones and relative spacing)).

Reference point P1 in FIG. 2 shows a location that, absent the advantages provided under the present invention, has a deficient amount of oxygen available to properly convert desorbing hydrocarbons from the HCT. For example, after $TWC_{cc}$ treatment, there can be (again absent the advantages of the present invention) a deficient amount of $O_2$ supply at point P1 leading to the desorbing HCT trap. Alternatively, or in addition (again absent the benefits provided under the present invention) the ECU engine calibration under the prior art places the exhaust gas at a stoichiometric or rich state that also results in their being insufficient $O_2$ to properly convert the rapidly escaping HCs from the HCT which has reached a desorbing temperature.

Under embodiments of the present invention, however, the exhaust gas feeding into the HCT-NOx trap combination 156 is strategically placed or maintained in a lean state during the desorption period by the CU (e.g., the exhaust gas air-fuel characteristics at point P1 is maintained in a $\lambda>1$ state (e.g., 1.02 to 1.1). This extended lean calibration can be achieved in this embodiment shown through feedback sensing with CU control (or pre-controlled settings for CU operation) such that, during the relevant desorption time period, there is provided suitable air-fuel ratio control to ensure sufficient $O_2$ supply over the HCT-NOx trap combination 156 to achieve high performance exhaust emission control (as in facilitating efforts to satisfy LEVIII standards).

The above described advantages work in conjunction with the ETA that can include (or not include) a $TWC_{cc}$ system. As noted above, the inclusion of an upstream TWC can be helpful in helping to lessen the temperature of the exhaust gas upon contact with an UB positioned HCT which can be more susceptible to degradation due to high temperature. Alternate embodiments of the ETA include, for example, a standard oxidation catalyst "OC" (e.g., an oxidation catalyst designed for a GDCI turbo out CC position as in one featuring PGM material on a high surface area particle support of gamma alumina, for example) either alone, if the system will allow, or in combination with an additional CC ETA component as in a $TWC_{cc}$ used in combination with the OC.

In the FIG. 2 example, there is illustrated two TWC's 152A and 152B supported on respective substrates 158A and 158B that are within a common canister or exhaust pipe length at the close coupled position. As an example of an alternate CC set up, substrate 158A can be a TWC and 158B an OC. FIG. 2 also shows sensor systems (with modal sensors M1 to M3 and thermocouple temperature sensor TS1 shown). Modal sensors M1 and M2 can be oxygen sensors for lambda determinations, which are already commonly found on most production gasoline engine vehicles in the noted positions upstream and downstream of the TWC system 152. Modal sensor M3, shown downstream from the TRAP 156, is an added component for supplying information to the CU (and/or ECU) relative to, for example, the downstream lambda value exiting the TRAP. Sensor M3 is preferably coupled with a temperature sensor Ts1 (as in a thermocouple) to monitor the outlet exhaust temperature of the TRAP. With the inclusion of M3 and/or Ts1 there is provided information to the CU which is informative of the desorption level of the HCT which information is helpful relative to timely shutting down a lean calibration designed for supplying oxygen over the HCT and returning to the normal predominately stoichiometric calibration of the engine. In an alternative embodiment either or both of M3 and Ts1 can be dispensed with and reliance placed on empirical modeling as to the presumed end of desorption (as in a comparison of engine run time at lean lambda for removal of the cold start HC load, for example).

The referenced modal sensors M1, M2 and M3 represent sensors suited for sensor system 41 and can include oxygen sensors as in the above noted UEGO and HEGO sensors. Thus, these sensors are representative of sensors that can be used to provide status information to the CU (e.g., both the ECU 44 and sub-part CU) to enable monitoring various attributes of the exhaust emission system 30 shown in FIG. 1. Thus, the various M1 to M3 modal sensors and the temperature sensor TS1 represent an example of a sensor set up which is only generically represented as sensor system 41 in FIG. 1. Insofar as the CU received data, as the lambda value sensing by the lambda sensors (e.g. HEGO and/or UEGO sensors) is highly informative, these can be relied upon alone by the CU (although preferably the CU also works in conjunction with temperature sensor(s) particularly the outlet bed temperature of the HCT). Furthermore, the depicted temperature sensor Ts1 at the outlet of the TRAP is additionally informative of ETA system status relative to when desorption is initialized, ongoing or complete in that the HCT acts like a chromatographic column. That is, as HCs are desorbed from the hotter front of the brick only to re-adsorb in the cooler rear sections until the rear is sufficiently hot enough to desorb them completely. Accordingly, with respect to systems as in FIGS. 5 to 13, a highly informative temperature for the control unit CU is the outlet bed temperature which Ts1 is informative thereto. The use of different modal sensors or other temperature sensors (with or without the temperature sensor at the outlet region of the TRAP) can be relied upon as in extrapolation from other temperature locations, computer modeling, etc.

The two close-coupled TWCs shown can be either of a common design or different as in a higher catalyst loading on the upstream $TWC_{cc}$ 152A and a lower catalyst loading on the downstream $TWC_{cc}$ 152B (again the present invention is inclusive of an ETA without a close-coupled TWC or one with multiple TWC's as shown in FIG. 2 or a single $TWC_{cc}$ 152 as in having only $TWC_{cc}$ 152A). In situations where there is one or more close coupled TWCs any TWC material forming part of the HCT-NOx trap combination 156 (e.g., any one of the examples in FIGS. 6 to 13 inclusive of TWC material) can have a common TWC composition as the $TWC_{cc}$ or one that is different (noting also the cooler temperatures associated with an underbody setting relative to close coupled positioning can provide for alternate compositions as they are less likely to be sintered by higher heat levels, etc.). The CAT-HCT catalyst coating described above is illustrative of a potential substrate $TWC_{cc}$ and TWC material.

Provided below are some further examples of suitable materials and characteristics for the components representing the ETA of the present invention and particularly those pertaining to the HCT-NOx trap (TRAP) combinations featured under embodiments of the present invention.

Substrates

Substrates on which the TRAP components can be supported include a flow through or wall-flow honeycomb body or bodies, or the substrate may take on a number of different forms, including, for example, one or more corrugated sheets; a mass of fibers or open-cell foam; a volume of porous particle bodies; and other filter-like structures. Also, if a honeycomb body is utilized, it may be made of suitable heat-resistant materials such as metal and/or ceramic materials. Preferably, the substrate, when in honeycomb body form, is composed of: cordierite, cordierite-alumina, silicon nitride, mullite, zircon mullite, spodumene, alumina-silica magnesia, zircon silicate, sillimanite, a magnesium silicate, zircon, petalite, alpha-alumina, an aluminosilicate, silicon carbide (SiC), aluminum titanate, or the like, and combinations thereof. Suitable embodiments of the invention include the substrates described above on which the coating material can be supported, as by having PGM metals supported on suitable (e.g., metal oxide) support carriers which are applied in washcoat fashion on to a substrate.

If more than a single substrate is involved, the substrates featured in the ETA can be all in common or there can be utilized different substrate materials depending upon either the location in the ETA or, for instance, the washcoat composition being supported at a particular region of the ETA.

HC-Trap Material

The present invention features an HCT having storage material for hydrocarbons (HC). Suitable storage materials for hydrocarbons include micro-porous solids, so-called molecular sieves, with zeolitic material representing a suitable micro-porous solid for HC trapping. Storage materials such as zeolitic (or zeotype) materials have a porosity suitable for storing or capturing hydrocarbons at least until a desired desorption temperature is reached. That is, the hydrocarbons are adsorbed while the exhaust gas is cold (for example during a cold start) and are desorbed and potentially converted when a higher exhaust-gas temperature is reached. A further feature of the zeolite is having acidic characteristics such as Bronsted and Lewis acidity. A feature of the trapping mechanism and HC retention up to high temperatures is that the smaller HCs such as alkenes (ethene, propene, butenes) and small aromatics such as toluene are polymerized to larger molecules via a carbenium ion mechanism. This results in the formation of coke pre-cursors which consist of polycyclic aromatics that desorb at high temperatures. As noted above, the presence of Pd, Ni and Cu in the trap layer accelerate these polymerization reactions by dimerization of alkenes. The presence of redox active base metals and oxygen storage materials such as Fe, Ni, Ce, Pd, etc. not only provide oxygen for HC combustion, but these elements are also considered to directly catalyze the combustion of coke (e.g., Fe and Pd). Embodiments of the invention feature having the HCT capture material supplemented to promote the conversion of the hydrocarbons with the use of metal based catalyst as in providing PGM material at catalytic centers. Suitable PGM loading amounts for the HCT include washcoat loadings of 5-100 $g/ft^3$, and more preferably 15-50 $g/ft^3$. Suitable loading amounts for the noted redox active base metals (such as Fe) include 1 to 10% by weight of the calcined HCT material and more preferably 2 to 6% by weight.

Zeolytic material is a material based upon the structural formalisms of Zeolites or Zeotypes generally having the following characteristics:

Zeolite: Zeolites are micro porous crystalline aluminosilicate materials characterized by well-ordered 3D structures with uniform pore/channel/cage structures typically of 3 to 12 Å (depending on framework type) and the ability to undergo ion exchange to enable the dispersion of catalytically active cations throughout the structure. Due to the presence of trivalent Al and four valent Si in the framework, the Al ion position is associated with a negative charge which can be balanced by either protons or other ion exchange elements such as $Cu^{2+}$, $Ni^{2+}$, $Pd^{2+}$, $Fe^{3+}$, $La^{3+}$, $Ce^{3+}$ etc. If the protons are present, then the zeolite has Bronsted acidity that can be enhanced by co-ion exchanged metal ions such as Fe, Ce, La, etc. Dehydration of the zeolite with removal of the protons as water results in the formation of Lewis acid sites at the Al sites. Zeolites with mixed Bronsted and Lewis acidity have strong Bronsted acidity. The Bronsted acidic strength can also be increased by co-ion exchanging multivalent ions such as $Ce^{3+}$ and $La^{3+}$ and highly charged small diameter ions such as $Fe^{3+}$. These can lead to the introduction of increased electrostatic field strengths within the zeolite cages that polarize the O=H bonds of the acidic hydroxyl groups thus increasing their acidity.

Zeotype: Zeotypes are structural isotypes/isomorphs of Zeolites but instead of a framework structure derived of linked Silica and Alumina tetrahedra they are based upon different combinations of material, for example: alumina-phosphate (ALPO), silica-alumina-phosphate (SAPO), metal-alumina-phosphate (Me-ALPO) or metal-silica-alumina-phosphate (MeAPSO).

Suitable zeolitic materials comprise, for example, mordenite (MOR), Y-zeolites (FAU), Ultra stable Y zeolites (USY), ZSM-5 (MFI) and β-zeolites (BEA) or mixtures thereof. These are preferably used in H-form or $NH_4$-form being exchanged with metals. The metal ions include, for example, transition, rare earth and P block elements like those mentioned above.

As already stated the HC-trap of the present invention can include a catalyst having, for example, TWC-functionality. (The TWC functionality mainly comes from the TWC or NOx trap component. However, it is beneficial that the zeolite/trap layer contains elements or metal ions.) A well suited HC-Trap supplement is Pd which is well suited in the HCT environment for polymerization of alkenes, and Fe for both its redox activity in providing oxygen when it cycles between $Fe^{3+}$ and $Fe^{2+}$ as well as directly catalyzing the oxidation of the bound polymeric HCs. Pd can also oxidize the large HC molecules. The presence of Pd (or PGM material in general) in the HCT (as in quantities described above in the HCT PGM loading discussion) is one distinguishing feature of an HC-trap as compared to dedicated or designated SCR catalysts in that PGMs are extremely toxic to SCR catalysts). In this regard, reference is also made to the below explanation concerning the TWC washcoat material which, although used in a different context, is informative as to types of PGM material that can be provided to the cationic sites of the HCT's trapping material such as the noted zeolites. Preferably metals are applied, such as Pt, Pd, Rh and mixtures thereof (preferably Pd alone) in association with materials like mordenite (MOR), Y-zeolites (FAU), ZSM-5 (MFI) and β-zeolites (BEA). Preferred zeolites include those with good trapping characteristics particularly ones suited for absorbing large HCs such as toluene and xylenes which can represent a large fraction of HCs in the exhaust. Zeolites that are considered well suited under embodiments of the present invention, include the betas and ultra-stable Y zeolites (faujasite structure). The difference between a normal Y zeolite and an ultra-stable Y (USY) is that they have been de-aluminated to give high $SiO_2/Al_2O_3$ ratios (high SAR values). De-alumination results in stronger Bronsted acidity and higher thermal stability. This facilitates the polymerization of small to large HCs which is believed to promote the mechanism of trapping and HC release at high temperatures.

For purposes of the present invention, if molecular sieves such as zeolites are used to trap HCs, a suitable SAR range is 5 to 1,000 and more preferably 15 to 100.

The catalyzed HC-trap preferably includes an adsorber material containing zeolitic material together with preferably a PGM, like Pt, Pd and Rh, (preferably Pd with or without the further presence of base metal ions such as Fe, as described above). Also, as seen for FIG. 5 the TRAP can be composed of a HCT plus LNT embodiment alone. But for many engine exhaust environments and intended running conditions, the inclusion of a TWC component is advantageous.

As an example of the generation of a suitable slurry for use in forming a HC-trap, slurry preparation begins with addition of a commercially available alumina stabilized silica sol to water and mixing. This material represents 4.5 wt. % of the final calcined washcoat loading. This step was followed by the addition of a commercially available boehmite and iron nitrate at contents of 1.0 and 4.5 wt. % respectively of the final calcined washcoat. A beta zeolite in the ammonium form and having a SAR value of 25 was then added and the slurry aged for two days. To this slurry was slowly added Pd nitrate solution one hour before coating. This slurry was then coated onto a ceramic substrate at a washcoat load of 3.64 g/in3 or 222 g/L.

Nitrogen Oxide Storage Catalysts (NOx-Traps or LNT)

Suitable nitrogen oxide storage catalysts (NOx traps) for use in the ETA of the present invention are described in the prior art (DE102008048854A, WO13008342A1, WO12140784A1, WO2011023332A, WO2005092481A, EP1317953A1, EP1016448B1, EP1321186B1, EP1911506A, US 2016/0082427 and EP1101528A). The NOx traps usually comprise basic compounds of alkali or alkaline earth metals which are deposited on suitable carrier materials in finely divided form. Furthermore, a nitrogen oxide storage catalyst also typically has catalytically active precious metals of the platinum group and oxygen storage materials. This composition provides the function of a nitrogen oxide storage catalyst under lean operating conditions, while under stoichiometric or rich operation the functionality of a three-way catalytic converter.

The operating principle of nitrogen oxide storage catalysts is described in detail in SAE document SAE950809 which is incorporated herein by reference.

The basic compounds include alkali metals, alkaline earth metals, in particular, however, barium oxide, and the rare earth metals, in particular, cerium oxide, are predominantly used as storage components in nitrogen oxide storage catalysts, the basic compounds reacting with nitrogen dioxide to give the appropriate nitrates (as described in further detail in the above referenced SAE article). As a cerium-containing storage material, one selected from the group consisting of cerium oxide, a cerium-zirconium mixed oxide, a cerium oxide doped with rare earth and combinations thereof is illustrative. The cerium-zirconium mixed oxide is preferably doped with 0.5 to 10 wt % lanthanum and/or praseodymium oxide, in relation to the total weight of the cerium-zirconium mixed oxide and lanthanum and/or praseodymium oxide.

Preferred basic storage materials are compounds containing Mg, Ba, Sr and Ca. It is known that these materials are present in the air, for the most part in the form of carbonates and hydroxides. These compounds are also suitable for storing nitrogen oxides. For this reason, when basic storage materials containing alkaline earth metal are mentioned in the context of the invention, they also include relevant carbonates and hydroxides.

Usually, the precious metals of the platinum group (e.g., Pt, Pd, Rh and combinations and sub combinations of the same) are used as catalytically active components which, like the storage components, are deposited on a carrier material. Suitable carrier materials for the components are temperature-stable metal oxides with large surface areas of more than 10 $m^2/g$, which facilitate a highly dispersed deposition of the storage components. For example, cerium oxide, cerium-containing mixed oxides, aluminum oxide, magnesium oxide, magnesium-aluminum mixed oxides, rare earth and some ternary oxides are suitable. For the most part, active aluminum oxide with a large surface area is used as the carrier material. The nitrogen oxide storage catalyst, which by application of the described method can be advantageously used; is, in its preferred embodiment, applied as a wall coating to substrate made of ceramic or metal. Flow honeycombs made of ceramic or metal are well suited as substrates for washcoat use in automobile applications. The nitrogen oxide storage catalyst envisaged here can also be present on or in a particulate filter (EP1837497A1, EP1398069A2, DE102009039249A). The term "on or in" means that it is possible to apply a coating to the wall or in the porous cavities of said wall or both (which is true for the various substrates described in FIGS. 5 to 13 above).

In addition to the above-mentioned storage materials, the present nitrogen oxide storage catalysts also preferably contain precious metals, as stated. The person skilled in the art orients himself, in relation to the quantity and type, toward the prior art for catalysts noted at the beginning. Preferably, such metals selected from the group consisting of palladium, platinum and rhodium are used as precious metals. The proportions can be selected in accordance with the knowledge available to the person skilled in the art, advantageously the platinum content in the storage material is 30-150, preferably 40-100 and quite preferably 50-70 g/cft. In relation to palladium, values of 10-150, preferably 20-100 and quite preferably 30-80 g/cft result. The rhodium is also present in a quantity of 0.5-10, preferably 1-8, and quite preferably 1-5 g/cft in the catalyst material. The ratio of metals to one another is 50-100:10-50:1-5 (Pt:Pd:Rh), preferably 70-90:12-30:2-4 and particularly preferably 80:16:3 (respectively +/−10%).

In accordance with the invention, the proposed nitrogen oxide storage catalyst has a specific ratio of cerium-containing storage materials to alkali earth metal storage materials. The ratio of 10:1 to 20:1 relates to the weight of the oxides of these two components ($CeO_2$:alkali earth metal oxide). Preferably, the ratio is 12:1 to 19:1 and quite particularly preferably between 12.5:1 and 18:1.

TWC Washcoat (e.g., Carrier Material and Catalyst Material)

According to aspects of the present invention wherein there is included an upstream $TWC_{cc}$ and/or a TWC material provided in the HCT-NOx trap combination being utilized (see FIGS. 6 to 13 for examples of the use of TWC material in the HCT-NOx trap combination being utilized). Each catalyst zone (CC and UB) is preferably prepared by coating a substrate (or other underlying layer) with an appropriate washcoat carrying a catalyst as to provide the three-way functionality. The composites can be readily prepared by processes well known in the prior art. As used herein, the term "washcoat" has its usual meaning in the art of a thin, adherent coating of a catalytic or other material applied to, for example, a carrier material (e.g., metal oxide carrier) with both the catalytic material and carrier material supplied on the above described supporting substrate such as a honeycomb-type support substrate, which is sufficiently open to permit the passage there through of the gas stream being treated (e.g., a flow-through monolith or a wall flow (e.g., gasoline engine particle trap) substrate). Reference is also made to the above described CAT-HCT TWC overcoat preparation and washcoat application which is an additional illustrative example of a TWC composition and washcoat slurry preparation.

In principle, and within the limits of the present invention, suitable TWC washcoats can be utilized in the treatment system, provided they provide effective treatment of gasoline engine exhaust gas. As noted above TWC catalysts operate most efficiently with exhaust gas falling at or close to $\lambda=1$. A discussion of suitable TWC washcoats and their application in zoned, single layer or multilayer design can be found e.g., in EP1974810B1, PCT/EP2011/070541, EP1974809B1, or PCT/EP2011/070539 (each incorporated by reference for background disclosure purposes). A discussion of a $TWC_{cc}$ in use, with downstream $HCT_{uf}$ can also be found in US 2016/0245207, which is also incorporated by reference.

Aspects of the present invention include the TWC washcoat as comprising a catalyst composed of PGM metals on a substrate carrier material as in a metal oxide carrier support material. The carrier support material is preferably selected from the group consisting of alumina, zirconia, zirconia-alumina, barium oxide-alumina, lanthana-alumina, lanthana-zirconia-alumina, and mixtures thereof. The metal oxide carrier support material of gamma-alumina is well suited for many present invention usages. Aspects of the present invention further include the carrier support material being doped with a rare-earth, alkaline earth or refractory metal oxide in an amount preferably ranging from 0.01 to 30 wt.-%, more preferably from 0.05 to 15 wt.-%, even more preferably from 0.1 to 10 wt.-%. In particular, the rare-earth, alkaline earth or refractory metal oxide is preferably selected from the group consisting of ceria, lanthana, praseodymium, neodymium, barium oxide, strontium oxide, zirconia and mixtures thereof, wherein the rare-earth, alkaline earth or refractory metal oxide is preferably lanthana, barium oxide and/or zirconia. One aspect of the present invention features the metal oxide carrier support material as gamma-alumina which is optionally doped with a rare-earth, alkaline earth or refractory metal oxide, more preferably with lanthana, barium oxide and/or zirconia. The incorporation of the PGM with the support material can be carried out in any of the known techniques in the art. For example, dispersion techniques to disperse metals on support oxides in order to obtain maximum catalytic function at the minimal concentration of applied transition metals involve, for example, impregnation, precipitation, ion exchange, etc., of the transition metal salt on to the desired support oxide. The present TWC material can also be provided to the carrier support material as by a solventless, dry loading technique such as that featured in US 2014/0112849 published Apr. 24, 2014 and assigned to Umicore AG (and which reference is incorporated herein for background disclosure purposes only).

In addition to said (e.g., metal oxide) carrier support material, the TWC washcoat can comprise an oxygen storage component (OSC). Oxygen storage materials have redox properties and can react with oxidizing components such as oxygen or nitrogen oxides in an oxidizing atmosphere and with reducing components such as hydrogen or carbon monoxide in a reducing atmosphere. These oxygen-storing materials are often doped with noble metals such as Pd, Rh and/or Pt, whereby the storage capacity and storage characteristic can be modified.

If utilized, oxygen-storing materials are usually composed of oxides of cerium and are possibly used with other metal oxides as thermally stable mixed phases (for example Ce/Zr mixed oxides), preferably chosen from the group consisting of ceria-zirconia-, ceria-zirconia-lanthana-, ceria-zirconia-neodymia-, ceria-zirconia-praseodymia, ceria-zirconia-yttria-, ceria-zirconia-lantha naneodymia-, ceria-zirconia-lanthana-praseodymia- or ceria-zirconia-lanthana-yttriamixtures. These are capable of removing oxygen from the exhaust gas under lean conditions and releasing to said exhaust gas again under rich exhaust-gas conditions. In view of this, it is preferable that if OSC' s are included in the $TWC_{uf}$ they be positioned downstream of the HCT such as shown in FIGS. 6 and 13 or as an overcoat. Furthermore, a filled oxygen store prevents the occurrence of HC and CO breakthroughs when the exhaust gas briefly passes into the rich range, since under rich exhaust-gas conditions, the stored oxygen firstly reacts with the excess HC and CO before a breakthrough occurs. In this case, the oxygen stored serves as a buffer against fluctuations above $\lambda=1$. A half-filled oxygen store has the best performance for intercepting brief deviations from $\lambda=1$. To detect the filling level of the oxygen stored during operation, use is made of $\lambda$ sensors (e.g., representing a sensor of sensor apparatus 41 shown in FIG. 1).

Aspects of the present invention include use of TWC materials that comprise platinum group metals, e.g., Pt, Rh and Pd. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Typically, when PGM components, e.g., Pt, Pd and/or Rh, are included in the washcoat, the component in question is utilized in the form of a compound or complex to achieve dispersion of the component on the metal oxide support. PGM loading examples for the TWC include Rh alone Rh and Pd, as examples of some preferred combinations.

Control System

The control unit CU of the present invention can comprise an individualized control system for the purpose of ETA functioning or, more preferably one that is integrated with a vehicle control system such as a standard engine control unit as in ECU 44 shown in FIG. 1. The control unit 44 embodiment example of the present invention thus features a supplemental engine control unit sub-part CU that is integrated with a standard ECU to take advantage of pre-existing various sensed parameters associated with ETA performance, and those parameters are utilized to fashion the appropriate oxygen lean $\lambda$ level during HC desorption. The general functioning of the ECU 44 includes, for example, sensing the temperature of the ambient air being fed within the system (e.g., at an engine's air intake box), the engine heat level (which can be correlated with the engine exhaust), and/or the exhaust temperature as in one or more thermocouples such as Ts1 featured in FIG. 2, the engine rpm level, the chemical attributes as in current composition or levels of various substances, or other "state-of-being" or "modality" information relative to the passing exhaust gas at one or more of the exhaust passageway locations, such as locations M1 to M3 shown in FIG. 2.

At least some of this sensed information (e.g., the air flow rate and fuel supply characteristics and/or a direct $\lambda$ value determination at a relevant exhaust passageway location) can be used by the CU to come to a determination as to $\lambda$ level status as to help ensure there is maintained a desired lean exhaust flow state over the TRAP during HCT desorption unless another vehicle requirement overrides. For example, embodiments of CU operation/configuration include controlling the lean lambda during HC desorption in a closed loop state of operation, by utilization of wide band oxygen sensor(s). Embodiments of the invention also include controlling, with the CU, the length of lean running to provide a suitable timeframe (predetermined and/or sensed desorption timeframe for which temperature sensors and the like are informative) to avoid release of unconverted HCs out the exhaust system outlet to a level above a regulated amount. Furthermore, the CU preferably stops/ aborts this mode of operation once it is deemed by the CU that all the HC's have desorbed from the HCT.

For instance, an embodiment of the invention features a control unit CU that is configured to receive a $\lambda$ level input such as an input generated by an oxygen sensor(s) amongst the sensor set shown in FIG. 2 and/or temperature values (e.g., Ts1 in FIG. 2) for use in detecting a timeframe for desorption and oxidation of desorbing HC's. Alternatively, the CU can operate without M3 and Ts1 sensors (shown in FIG. 2) and set a lean run time deemed necessary to achieve a desired level and duration of oxygen supply to the desorbing HC's based on modeling (optionally inclusive of usage of upstream modal sensors M1 and M2 found on standard car in the modeling process).

The sensed (or modeled) desired $\lambda$ value is stored in the control unit CU, and utilized by the CU in a determination (e.g., a value based on current engine parameters and/or exhaust gas composition measurement at the $HCT_{uf}$) as to the preferred lean $\lambda$ value best suited for removing the current level of desorbed HC's of the $HCT_{uf}$ (while maintaining an effort to not generate excess NOx beyond what the TRAP is intended to accommodate and/or lead to improper engine performance for a given load). The control unit CU instructs the emission system to enhance (or reduce) the oxygen amount being provided in the lean exhaust flow (as by fuel reduction and/or added air input to the engine) to achieve the desired lean $\lambda$ value for helping with HC desorption within the limit of not over generating NOx for which the TRAP cannot appropriately accommodate or lead to undesirable engine performance.

The control unit CU can also monitor current oxygen and fuel inputs to the engine and use that information as to extrapolate the anticipated $\lambda$ value post engine combustion; which information can be used instead or in conjunction with direct $\lambda$ value sensing. For example, the current $\lambda$ value can be compared with a desired $\lambda$ value needed for desorbed HC conversion and the extrapolated information concerning the current feeds to the engine can be used to facilitate the logic control of the CU. For example, if there is sensed a need to increase the lean $\lambda$ value to meet the HC desorption conversion criteria, the increase level can be dampened if the co-current sensing of in-feeds to the engine suggest a more lean result by the time the combusted gas reaches the HCT. The control function of control unit CU can be carried out on a continuous basis as in millisecond cycling within a desired endpoint timeframe associated with the desorption cycle of the HCT, such as one which is based on the temperature level reached by the HCT (e.g., see the 400 to 450° C. level range discussed above, which is past the "expected" sufficiently high enough temperature of over 250° C. described relative to the graphed FIGS. 3 and 4).

In other words, the sensed information is considered by the control means of the present invention (e.g., the supplemental enhanced electronic control unit CU) to come to a determination as to whether a proper lean $\lambda$ value is present that will provide an oxygen supply that is best suited for achieving the goal of sufficient oxygen levels for conversion of the desorbing HCs at a given engine exhaust temperature at that region (without generating too much NOx that cannot be handled by the NOx storage capability of the TRAP or creating improper engine performance). This lean $\lambda$ value duration, relative to the HC desorption period, is maintained for a time range that is either based on a predetermined triggering event being experienced (as in reaching a predetermined temperature), or some other triggering event such as reaching a predetermined time period end, and/or a sensed discontinuance of desorption preferably directly at the HCT. The controller CU of the present invention is also configured in embodiments to control operation of the various means to maintain a desired λ value despite variation influences (unless of an overriding type, as in an operator sensed need for rapid acceleration). This lean maintenance control can be achieved by the above described techniques of an increase in ambient air flow and/or a lessening of an ongoing fuel supply level (using techniques pre-established in the art such as that utilized in the controlled toggling of λ to achieve efficient operation of a $TWC_{cc}$).

Figure 15:
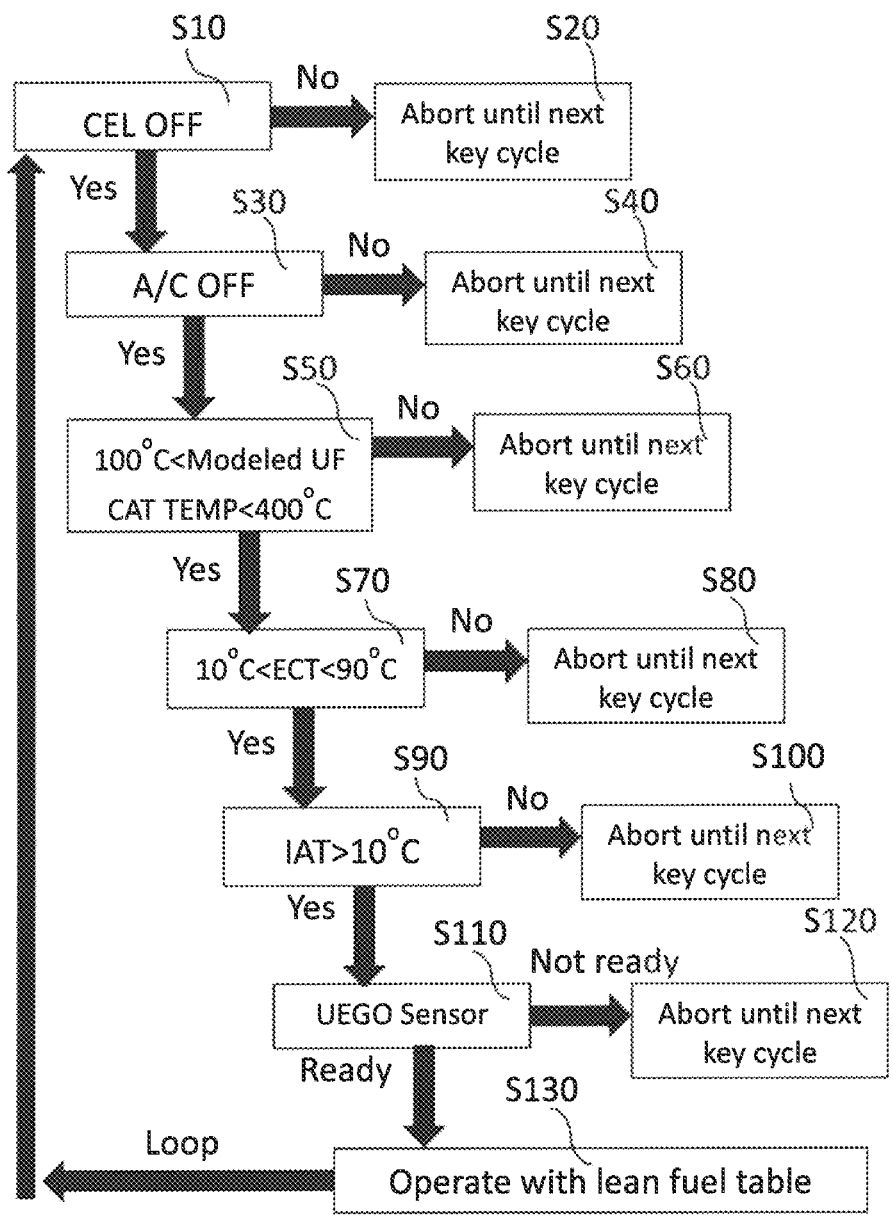
FIG. 15 shows a logic flow diagram for a control unit of the present invention working with the TRAP to achieve enhanced desorption phase HC emission reduction.

FIG. 15 shows one example of a logic flow diagram for the control unit for use with a lean operating HC-trap designed for desorption phase emission reduction. As seen in FIG. 15, in this embodiment, there is featured the following steps. That is, in step S10 (as part of the HC-trap desorption phase review) there is a review as to whether a check engine light is off (i.e., no emissions related faults currently are set). If no, (the check engine light is on) the present cycle is aborted at step S20. If yes, (a check engine light is off) the step S30 is carried out wherein a determination is made as to whether or not the A/C is on or some component of the vehicle is drawing such a heavy load suggesting a lean run is non-desirable). If there is such a sensed load (A/C requirement), then step S40 is a similar abort till next cycle. Again, this is because an A/C compressor places high loads on some engines such that lean operation is often not desired. If, however, the engine is able to handle such higher loads and retain a suitable lean run for the HC desorption conversion under the present invention, this step check can be avoided or modified (e.g., the lean limit under the present invention can be reviewed by the CU as a function of load with a determination made as to whether a desired lean level is suitable to accommodate both the desired extended lean run as well as the sensed engine load requirements, inclusive of a compromise situation wherein, e.g., even if an engine load requirement is sensed, as in the A/C is sensed as being on, the engine may still be operated lean by the CU, but at a lowered lean state (1.1 down to 1.05 for example)).

In step S50 there is determined whether the UB TRAP temperature (e.g., HCT outlet temperature) is within a predetermined range, as in the 100° C.≤X≤400° C. range noted in the drawing as a non-limiting but illustrative range. This determination represents a parameter that is helpful in determining a desired lean operation timeframe. For instance, many CC model the CC catalyst temperature in order to provide a measure of protection against it operating too hot. Multiple other measured parameters are used to model the temperature, and are validated against experimentally measured data. In the same way, the UB catalyst bed temperature modeled under the present invention uses that information to control the lean operation period. Accordingly, when X temperature is within a predetermined range, the control unit models an appropriate lean run cycle, and proceeds to step S70 to confirm such lean cycle running is appropriate under given engine operation needs. If the X temperature value is not in the range under the current review, the analysis is aborted until the next cycle as per step S60. In step S70 a check is made as to an engine warm up state, with engine water temperature being one reliable indicator. If the engine current temperature (ECT or Y in the following equation) is not within the noted illustrated range of 10° C.≤Y≤90° C. there is an abort step at S80. The reason for this is that combustion stability will suffer when operating a cold engine lean (<10° C.) Furthermore, a highly warmed up engine with water temperature (>90° C.) means the whole system (including exhaust) is warmed enough that there won't be any trapping function) that can lead to a need for later released HC conversion. It is noted that there is a correlation between engine coolant temperature and exhaust temperature. If a vehicle engine is started and the engine coolant temperature is close to its fully warmed up operating temp (~90° C.), this means the exhaust will still be hot from the previous 'trip', and the HC trap won't function to store any HC's, since HC traps only store when they are cool enough. The exhaust temp is modeled based on ECT, time since engine shut down, etc. The lean operation during desorption of HC's from a HC trap in accordance with the present invention is preferably only executed when it is determined that the HCT has stored HC's as during a 'cold' start, or if a previously executed lean desorption cycle did not run or did not run to completion because it was interrupted (e.g. vehicle shut off).

At step S90 there is determined whether the intake air temperature (IAT) passes a predetermined level, as in 10° C. If not, S100 is an abort step since cold intake air temperatures inhibits lean operation. If the IAT temperature is high enough, the control system moves step S110 where a sensor check is made as to current TRAP temperature with the current temperature sensor. An oxygen sensor (UEGO or universal exhaust gas oxygen sensor) can be used here as well in order to control to an exact lean lambda target setting in a closed loop fashion. In other words, with the known lean cycle model initially determined, there can be made suitable adjustment if sensing under a feedback loop suggests an undesirable deviation. If the UEGO sensor is not shown to be in a ready mode the abort step S120 is carried out.

In step S130 a mapping comparison is made. For example, the fueling is controlled from a two dimensional map or table which is retained in the control unit to help control to a target lambda under given engine conditions (e.g., the target lambda can be a function of engine load on the 1st axis, and engine speed on the 2nd axis). In this way there is avoided combustion instability at higher loads where lean lambda operation is not desirable or safe.

Method of Using the Present Invention

The scope of the present invention is also inclusive of a method of using the ETA and CU combination, which includes passing exhaust gas generated by the predominately stoichiometric running engine E though a gas passage over the TRAP (e.g., one of the embodiments depicted in FIGS. 5 to 13) and utilizing control unit CU to place the exhaust gas passing to the HCT of the TRAP into a lean state (e.g., a λ value of 1.02 to 1.1 during a time period of desorption of the HCs from the HCT (e.g., running (preferably continuously) lean without interruption (or with only minor interruptions as in the aforementioned short time period fuel inputs described for FIG. 4)). As seen from FIG. 15 a temperature check of, for example, the outlet end of the HCT can be used to help determine when to initiate the lean supply cycle and/or a downstream modal sensor such as M3. For example, the output of the modal sensor and/or the temperature of the HCT (or some other informative component/location in the exhaust system) can be monitored from the origination of the cold start and when the lower end of a range is passed (e.g. 100° C.) the lean flow cycle can be initiated in the exhaust flow as by CU adjustments in the engine-in oxygen level. The example of a lower point temperature being set as to ensure lean running during a time of desorption of the HC's can be set an amount lower than the actual anticipated light off temperature, although the anticipated light off temperature can also be used as the trigger point (the former better providing for, however, the inherent lag between triggering more oxygen supply and that added oxygen supply reaching the HCT). Thus, generally lean flow is provided at a point following initial cold start (e.g., temperature less than 200° C.)) to a point where the conversion of desorbed HC's using the lean exhaust addition oxygen source is achieved to an extent directed at reaching the goal of satisfying regulations, such as LEVIII. In addition, as also seen from FIG. 15 step S50, the control unit CU can control the system as to maintain a lean exhaust flow from the time of initiation to a point where the HCT reaches a temperature greater than 400° C. or a higher temperature, as in greater than 400° C. to 450° C. or even a higher temperature setting depending on how fast the temperature is rising for a given system. As described above, the CU can be programmed with alternate criteria to have CU control an extended lean running of engine E (e.g., a time based system from initiation of cold start). Preferably the control parameters are carried out in conjunction with control feedback in an effort to facilitate staying within a desired λ program despite various dynamic variations in the system operation (e.g., using the sensor system 41 to determine when the HC desorption is considered complete).

Method of Assembling the Present Invention

The present invention also includes within its scope the assembling of an emission system that includes assembling an ETA to handle emissions generated by a gasoline running engine as well as the CU for use with the ETA. The method of assembling including providing in an exhaust line a TRAP with embodiments such as those shown in FIGS. 5 to 13 being representative. Alternate embodiments including further adding an upstream close coupled catalyst as in one or more TWCs placed in a common exhaust passageway with the TRAP. The scope of the present invention is further inclusive of assembling an emission system comprising an embodiment of the ETA such as those described above with a predominately stoichiometric gasoline engine. An embodiment of the invention further includes providing the CU to be in communication with the ETA status as in a sub-unit of a (modified) ECU or to provide a modeling as to the status of the ETA's operation.

The invention helps in the reduction of cold start HC emissions, but embodiments can also improve NOx emissions and hot restart HC and NOx emissions for the FTP test. The invention may be particularly helpful for hybrids and stop-start applications. The help in the reduction of such emissions also correlates with reductions in PGM loadings for the close-coupled catalysts as the high Pd loads are typically required for improved cold start HC light-off. By using the TRAP and CU combination of the present invention there can be achieved reductions in cold start HC emissions, such that lower Pd loadings in the CC catalyst can now be used. For example, a removal of 50-300 g/ft$^3$ Pd from the CC catalyst can be undertaken in some environments with the current system as opposed to operation without the present extended lean control with TRAP configurations.

Further, relative to any ranges presented in the present application, the ranges expressed in the disclosure include the endpoints of each range, all values in between the endpoints, and all intermediate ranges subsumed by the endpoints. For example, a range of 400 to 450° C. is also considered inclusive of each individual unit value as in 400, 401, 402, etc., as well, as sub-ranges therein such as 400 to 435° C. This indication, as to the inclusive nature of values and sub-ranges within range expressions, should not, however, be misconstrued as precluding certain ranges, sub-ranges or values therein having criticality for specific end results.

Finally, it will be understood that the articles, systems and methods described herein are exemplary in nature, and that these specific embodiments, aspects, or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

What is claimed is:

1. An exhaust emission reduction system suited for use with a gasoline running engine, comprising:
an exhaust treatment apparatus having an underbody positioned NOx-trap and HC-trap combination;
a control unit operable to extend a lean exhaust condition into a period of desorption of hydrocarbons trapped by the HC-trap as to promote hydrocarbon emission reduction during the desorption period.

2. The system of claim 1 wherein the NOx-trap and HC-trap combination includes a substrate support onto which the HC-trap is layered and over which HC-trap layer the NOx-trap is layered.

3. The system of claim 1 wherein the exhaust treatment apparatus further comprises one or more TWC components.

4. The system of claim 3 wherein the exhaust treatment apparatus comprises both an upstream close coupled TWC component and a downstream, underbody TWC component, with the downstream TWC being in a common support canister with NOx-trap and HC-trap components of the NOx-trap and HC-trap combination.

5. The system of claim 3 wherein the NOx-trap and HC-trap combination includes a substrate support onto which the HC-trap is layered and over which HC-trap layer the NOx-trap is layered, and wherein the one or more TWC components includes a TWC component positioned downstream of the NOx-trap and HC-trap combination.

6. The system of claim 1 wherein the exhaust treatment apparatus includes a close coupled TWC and the NOx-trap and HC-trap combination includes an upstream underbody NOx-trap on a first support substrate and a second support substrate which supports an HC-trap layer and a TWC layer over the HC-trap layer.

7. The system of claim 1 wherein the exhaust treatment apparatus includes a first support substrate with an HC-trap layer with PGM material, and over which the HC-trap layer is supplied with one or both of a NOx-trap layer and a TWC layer.

8. The system of claim 7 wherein only a TWC layer is supplied over the HC-trap layer and a second support substrate is positioned downstream of the first support substrate, and with the second support substrate supporting the NOx-trap layer of the NOx-trap and HC-trap combination.

9. The system of claim 7 wherein both the TWC layer and the NOx-trap layer are provided over the HC-trap layer so as to be supported on the first support substrate.

10. The system of claim 9 wherein at least a portion of the TWC layer is positioned upstream of a downstream end of the NOx-trap layer.

11. The system of claim 9 wherein at least a portion of the TWC layer is positioned downstream of an upstream end of the NOx-trap layer.

12. The system of claim 1 wherein the exhaust treatment apparatus includes a first support substrate which supports a first HC-trap zone and a second zone occupied by one of (a) and (b), with (a) being the NOx trap and (b) a TWC layer, and over which first and second zones supported by the first support substrate is provided an over covering of one of (a) or (b), with the over covering being the (a) or (b) not representing the second zone.

13. The system of claim 12 wherein the HC-trap zone comprises a PGM which includes Pd and a transition metal and/or P-block metal component.

14. The system of claim 12 wherein (a) is provided as the second zone, and which second zone is upstream of the HC-trap zone, and (b) extends over each of (a) and the HC-trap zone.

15. The system of claim 12 wherein (a) is provided as the second zone, and which second zone is downstream of the HC-trap zone, and (b) extends over each of (a) and the HC-trap zone.

16. The system of claim 12 wherein (b) is provided as the second zone, and which second zone is downstream of the HC-trap zone, and (a) extends over each of (b) and the HC-trap zone.

17. The system of claim 1 wherein the control unit receives input sensing information and/or modeling information of HC desorption characteristics and extends a period of lean exhaust supply to the HC-trap layer during a period of desorption of the HC-trap based on the received information.

18. The system of claim 1 wherein the control unit sets a time period or system temperature parameter which ensures a lean exhaust supply to the HC-trap layer at a time when the HC-trap layer is desorbing hydrocarbons, and optionally the control unit receives feedback monitoring information as to desorption characteristics or desorption period timing relative to the HC-trap.

19. The system of claim 1 wherein the control unit sets an extended period of time or temperature range end point, after a prior cold start period, wherein lean exhaust flow is provided to the desorbing HCT before returning to a predominately stoichiometric exhaust flow over the HC-trap.

20. The system of claim 1 further comprising an engine of either a hybrid or non-hybrid form, which engine is selected from the group consisting of port-fuel injection (PFI) engines, stratified charge engines (SCE), gasoline direct engines (GDI), dual injection system engines (PFI+GDI), and gasoline direct injection compression ignition (GDCI) engines.

21. The system of claim 1 wherein, relative to an entire length from an engine exhaust output to a release point of that exhaust to the atmosphere, there is lacking a dedicated SCR catalyst unit.

22. The system of claim 1 wherein the control unit includes a signal transmitting component, with the signal transmitting component including a signaling device that retains an extended period of lean exhaust flow over the HC-trap and NOx-trap combination receiving exhaust output from the predominately stoichiometric running gasoline engine which, but for the control unit signaling, would calibrate to a predominately stoichiometric lambda setting.

23. A method of reducing exhaust emissions comprising passing exhaust over the exhaust treatment apparatus in the exhaust emission reduction system of claim 1.

24. The system of claim 1 wherein the exhaust treatment apparatus is free of communication with a SCR in either an upstream or downstream exhaust flow direction.

25. The system of claim 24 wherein the HC-trap is supported on a first support substrate together with at least one of the NOx-trap material and a TWC material.

26. The system of claim 25, further comprising a canister and wherein all three of the HC-trap, NOx-trap, and TWC are in the canister.

27. The system of claim 1 wherein the extension of the lean exhaust condition by the control unit involves a continuous maintenance of the lean exhaust state from a point of initiation of the lean state for hydrocarbon emission reduction by the exhaust treatment apparatus until completion of a full period of desorbing hydrocarbon emission reduction by the exhaust treatment apparatus.

28. The system of claim 1 wherein the lean exhaust condition extension is stopped by the control unit upon a determination by the control unit that the extension is sufficient to reduce all hydrocarbon desorption from the HC-Trap.

* * * * *